US011231591B2

(12) United States Patent
Shimizu

(10) Patent No.: US 11,231,591 B2
(45) Date of Patent: Jan. 25, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Takayoshi Shimizu, Chiba (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/481,755

(22) PCT Filed: Feb. 15, 2018

(86) PCT No.: PCT/JP2018/005283
§ 371 (c)(1),
(2) Date: Jul. 29, 2019

(87) PCT Pub. No.: WO2018/155303
PCT Pub. Date: Aug. 30, 2018

(65) Prior Publication Data
US 2019/0391402 A1 Dec. 26, 2019

(30) Foreign Application Priority Data

Feb. 24, 2017 (JP) .............................. JP2017-032852

(51) Int. Cl.
G02B 27/01 (2006.01)
G02B 27/00 (2006.01)
G06F 3/01 (2006.01)

(52) U.S. Cl.
CPC ..... G02B 27/0179 (2013.01); G02B 27/0093 (2013.01); G06F 3/013 (2013.01); G02B 2027/0187 (2013.01)

(58) Field of Classification Search
CPC ...... G02B 27/079; G02B 27/0093; G06F 3/13
See application file for complete search history.

(56) References Cited

U.S. PATENT DOCUMENTS 9,007,301 B1* 4/2015 Raffle ................. G02B 27/017
345/156
2012/0242570 A1* 9/2012 Kobayashi ......... G02B 27/0093
345/156
2014/0055554 A1* 2/2014 Du ..................... G06K 9/00268
348/14.07

(Continued)

FOREIGN PATENT DOCUMENTS

JP 2004-199386 A 7/2004
JP 2014-149836 A 8/2014
JP 2016-191845 A 11/2016

Primary Examiner — Alexander Eisen
Assistant Examiner — Nathaniel P Brittingham
(74) Attorney, Agent, or Firm — Paratus Law Group, PLLC

(57) ABSTRACT

An information processing apparatus according to an embodiment of the present technology includes: an acquisition unit; and a motion control unit. The acquisition unit acquires motion information of a left eye of a user and motion information of a right eye of the user. The motion control unit controls, on a basis of a predetermined condition corresponding to human characteristics relating to motion of human eyes, motion of a left eye and motion of a right eye of a model of the user in association with each other so as to be non-linear with respect to the acquired motion information of the left eye and the acquired motion information of the right eye.

18 Claims, 11 Drawing Sheets

Corrected line-of-sight directions

Controlled eyes of model

(56) References Cited

U.S. PATENT DOCUMENTS

| | | | |
|---|---|---|---|
| 2015/0178589 A1* | 6/2015 | Park | G06K 9/00604 |
| | | | 382/203 |
| 2016/0314562 A1* | 10/2016 | Sakamoto | G06T 15/80 |
| 2018/0046842 A1* | 2/2018 | Tomimori | G06K 9/00 |
| 2018/0232934 A1* | 8/2018 | Schmidt | G06Q 10/10 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/005283 (filed on Feb. 15, 2018) under 35 U.S.C. § 371, which claims priority to Japanese Patent Application No. 2017-032852 (filed on Feb. 24, 2017), which are all hereby incorporated by reference in their entirety.

TECHNICAL FIELD

The present technology relates to an information processing apparatus, an information processing method, a program that are capable of controlling an avatar or the like of a user.

BACKGROUND ART

In the past, there has been known a technology for generating a virtual character (avatar) who is the other self of a user by using a computer system or the like. The user is capable of performing communication or the like with, for example, a different user by operating and controlling his/her avatar displayed on a display or the like.

Patent Literature 1 describes an operation of an avatar using a controller. In Patent Literature 1, activity of the controller, such as a change in position of the controller held by a user and a button operation, is detected. On the basis of the detected activity of the controller, posture, motion, expression, and the like of the avatar is controlled. As a result, for example, the user is capable of selecting and expressing various emotions using his/her avatar (paragraphs [0001], [0008], and [0033] of the specification of Patent Literature 1).

Further, Patent Literature 2 describes a technology for detecting the line of sight of a user and controlling display of an image. In Patent Literature 2, an HMD (Head Mount Display) on which a camera that images an eyeball of the user is used. The camera images an eyeball of the user, and the line-of-sight direction of the user is acquired. On the basis of the line-of-sight direction, a gaze point on the HMD at which the user is gazing is calculated. A partial image with high image quality is displayed centering on the gaze point, and an image with low image quality is displayed around the partial image. Therefore, display of the image is controlled with reference to the region that can be recognized by the user with high accuracy (paragraphs [0051], [0052], [0060], and [0066] of the specification, FIGS. 1 and 3, and the like of Patent Literature 2).

CITATION LIST

Patent Literature

Patent Literature 1: Japanese Patent Application Laid-open No. 2014-149836
Patent Literature 2: Japanese Patent Application Laid-open No. 2016-191845

DISCLOSURE OF INVENTION

Technical Problem

It seems that a system for performing communication using an avatar will be widespread from now on, and a technology capable of activating communication is desired. In view of the circumstances as described above, it is an object of the present technology to provide an information processing apparatus, an information processing method, and a program that are capable of activating communication by an avatar.

Solution to Problem

In order to achieve the above-mentioned object, an information processing apparatus according to an embodiment of the present technology includes: an acquisition unit; and a motion control unit.

The acquisition unit acquires motion information of a left eye of a user and motion information of a right eye of the user.

The motion control unit controls, on a basis of a predetermined condition corresponding to human characteristics relating to motion of human eyes, motion of a left eye of a model of the user and motion of a right eye of the model of the user in association with each other so as to be non-linear with respect to the acquired motion information of the left eye and the acquired motion information of the right eye.

In this information processing apparatus, motion information of a left eye of a user and motion information of a right eye of the user are acquired. Then, on the basis of a predetermined condition corresponding to human characteristics relating to motion of human eyes, motion of a left eye of a model of the user and motion of a right eye of the model of the user are controlled as to be non-linear with respect to the motion information of the left eye and the motion information of the right eye. Further, the motion of the left eye of the model and the motion of the right eye of the model are controlled in association with each other. As a result, it is possible to cause both eyes of the model to operate in a human-like manner, and activate communication by an avatar.

An information processing method according to an embodiment of the present technology is an information processing method executed by a computer system, including: acquiring motion information of a left eye of a user and motion information of a right eye of the user.

On a basis of a predetermined condition corresponding to human characteristics relating to motion of human eyes, motion of a left eye of a model of the user and motion of a right eye of the model of the user are controlled in association with each other so as to be non-linear with respect to the acquired motion information of the left eye and the acquired motion information of the right eye.

A program according to an embodiment of the present technology causes a computer system to execute the following steps of:

acquiring motion information of a left eye of a user and motion information of a right eye of the user; and controlling, on a basis of a predetermined condition corresponding to human characteristics relating to motion of human eyes, motion of a left eye of a model of the user and motion of a right eye of the model of the user in association with each other so as to be non-linear with respect to the acquired motion information of the left eye and the acquired motion information of the right eye.

Advantageous Effects of Invention

As described above, in accordance with the present technology, it is possible to activate communication by an avatar.

It should be noted that the effect described here is not necessarily limitative and may be any effect described in the present disclosure.

MODE(S) FOR CARRYING OUT THE INVENTION

Hereinafter, embodiments according to the present technology will be described with reference to the drawings.

[Configuration of Information Processing Apparatus]

Figure 1:
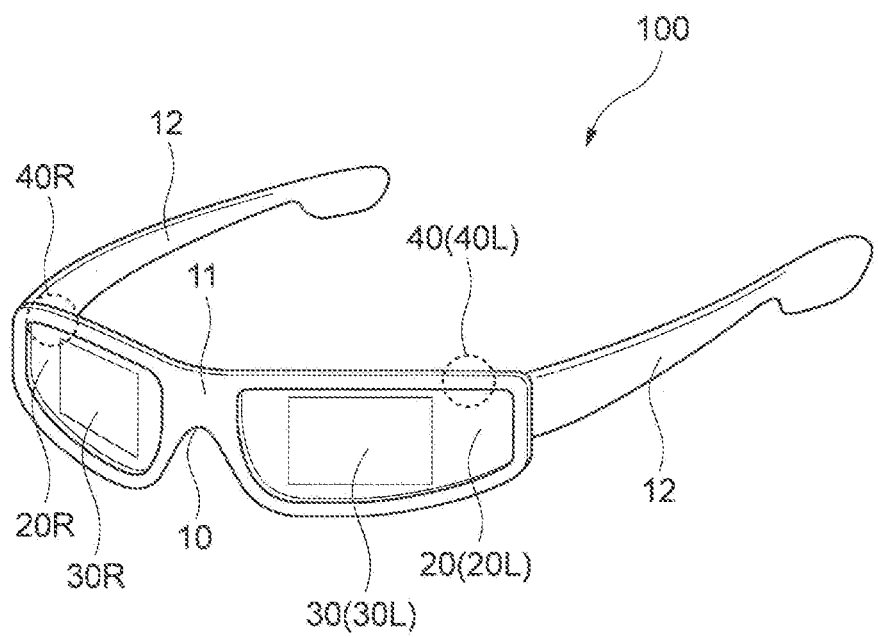
FIG. 1 is a perspective view schematically showing the appearance of a head mounted display (HMD) according to an embodiment of the present technology.

FIG. 1 is a perspective view schematically showing the appearance of a head mounted display (HMD) according to an embodiment of the present technology. An HMD 100 is a glasses-type apparatus including a transmissive display, and is attached to the head of a user and used. The HMD 100 operates as an embodiment of an information processing apparatus according to the present technology.

The HMD 100 includes a frame 10, a lens 20, a display unit 30, and an imaging unit 40. The frame 10 has a glasses-shape, and includes a rim 11 and a temple 12. The rim 11 is a portion disposed in front of the left eye and the right eye of the user, and supports the left and right lenses 20L and 20R. The temple 12 is a portion that extends rearward from both ends of the rim 11 toward both ears of the user, and is attached to the ears.

The left and right lenses 20L and 20R are respectively disposed in front of the left eye and the right eye of the user. Typically, the lens 20 is designed to correct the user's vision. The present technology is not limited thereto, and a so-called non-prescription lens may be used.

The display unit 30 includes a left-eye display 30L and a right eye display 30R. The left-eye and right-eye displays 30L and 30R are disposed in front of the left eye and the right eye of the user so as to cover at least a part of the field of view of the user. In this embodiment, as the display unit 30, the left-eye and right-eye displays 30L and 30R provided on the left and right lenses 20L and 20R are used. The method or the like of disposing the displays 30L and 30R is not limited. For example, the rim 11 may support the displays 30L and 30R.

The left-eye and right-eye displays 30L and 30R are each a transmissive display. On the left-eye and right-eye displays 30L and 30R, images or the like for the left eye and the right eye of the user are respectively displayed. The user wearing the HMD 100 is capable of viewing the real landscape and viewing the image displayed on each display. As a result, the user is capable of experiencing augmented reality (AR) and the like.

Note that light control devices (illustration omitted) or the like may be provided outside the left-eye and right-eye displays 30L and 30R (side opposite to the user's eyes). The light control device is a device capable of controlling the amount of light transmitted through the device. By providing the light control device, for example, it is possible to control the real scenery viewed by the user through each display, emphasize the image displayed on each display, and cause the user to view the image. As a result, the user is capable of experiencing virtual reality (VR) and the like.

The specific configuration of each of the left-eye and right-eye displays 30L and 30R and the light control device is not limited. As each of the left-eye and right-eye displays 30L and 30R, for example, a transmissive organic EL display, an LCD (Liquid Crystal Display) display, or the like is used. Further, as the light control device, for example, a light control glass, a light control sheet, a liquid crystal shutter, or the like capable of electrically controlling the transmittance is used.

The imaging unit 40 includes a left-eye camera 40L, and a right-eye camera 40R. The left-eye and right-eye camera 40L and 40R are provided inside the rim 11 (side facing the user's eyes) so as to be capable of imaging the left eye and the right eye of the user, respectively. Note that in FIG. 1, positions where the cameras are provided are schematically illustrated. The positions and the like where the left-eye camera 40L and the right-eye camera 40R are not limited, and the left-eye camera 40L and the right-eye camera 40R may be provided at arbitrary positions where they are capable of imaging the left and right eyes of the user, respectively.

The left-eye and right-eye camera 40L and 40R respectively image the left eye and the right eye of the user and generate imaging information of the left eye and the right eye. As each of the left-eye and right-eye camera 40L and 40R, for example, a digital camera including an image sensor such as a CMOS (Complementary Metal-Oxide Semiconductor) sensor and a CCD (Charge Coupled Device) sensor is used. Further, for example, an infrared camera including infrared illumination such as an infrared LED may be used.

Figure 2:
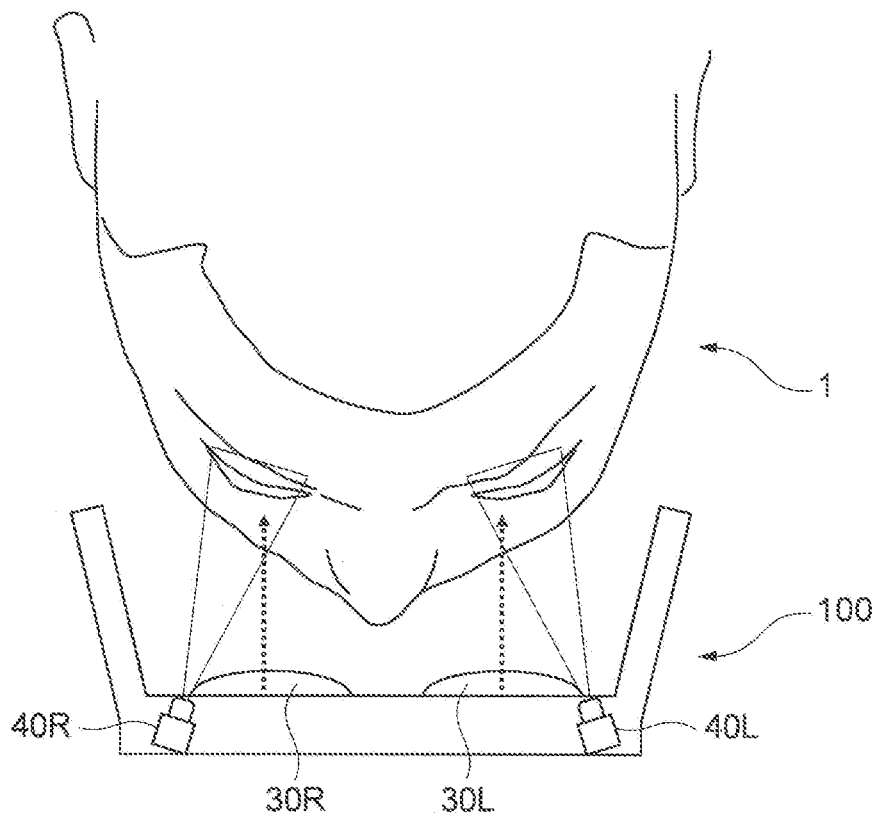
FIG. 2 is a schematic diagram showing an example of arrangement of a left-eye camera and a right-eye camera.

FIG. 2 is a schematic diagram showing an example of arrangement of the left-eye camera 40L and the right-eye camera 40R. In FIG. 2, a user 1 wearing the HMD 100 is schematically illustrated. As shown in FIG. 2, the user 1 views an image displayed on each of the left-eye and right-eye displays 30L and 30R. While the user 1 is viewing the images, the left-eye and right-eye camera 40L and 40R image the left eye and the right eye of the user, respectively.

The imaging range of the left-eye camera 40L (right-eye camera 40R) is a range in which the entire image of the left eye (right eye) including the eyeball of the left eye (right eye) of the user and the periphery of the eyeball (inner corner of the eye, outer corner of the eye, eyelash, eyelid, and the like) can be imaged.

Each of the cameras generates, as the imaging information of the left eye and the right eye, a color image, a monochrome image, or the like of the left and right eyes of the user at a predetermined frame rate, for example. Further, in the case of using an infrared camera or the like, a Purkinje image or the like in which a spot of infrared illumination (infrared LED or the like) is reflected on the cornea is generated as the imaging information of the left eye and the right eye. In addition, the format and the like of the imaging information are not limited.

Figure 3:
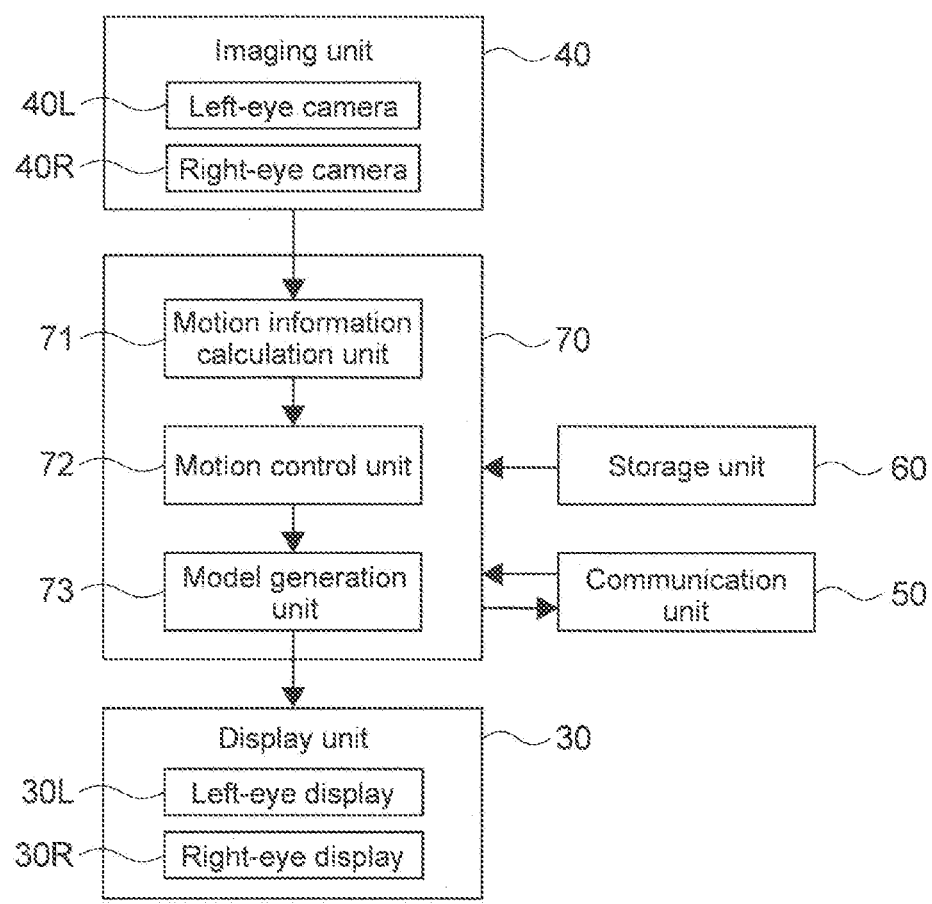
FIG. 3 is a block diagram showing a functional configuration example the HMD shown in FIG. 1.

FIG. 3 is a block diagram showing a functional configuration example of the HMD 100 shown in FIG. 1. The HMD 100 further includes a communication unit 50, a storage unit 60, and a controller 70. The positions and the like where the communication unit 50, the storage unit 60, and the controller 70 are provided are not limited. For example, they are provided at predetermined positions inside the frame 10 of the HMD 100.

The communication unit 50 is a communication module for communication with a different device via a network such as a LAN (Local Area Network) and a WAN (Wide Area Network). A communication module for short-range wireless communication such as Bluetooth (registered trademark) may be provided. Further, a communication device such as a modem and a router may be used.

The communication unit 50 inputs data received from a different device to the controller 70. Further, the communication unit 50 transmits data output from the controller 70 to the different device. Therefore, the user wearing the HMD 100 is capable of communicating with, for example, a different user who uses the different device by transmitting/receiving image data or the like to/from the different user.

The storage unit 60 is a non-volatile storage device, and is, for example, an HDD (Hard Disk Drive), an SSD (Solid State Drive), a flash memory, or another solid-state memory.

In the storage unit 60, a predetermined condition corresponding to human characteristics relating to motion of human eyes is stored. The human characteristics relating to motion of human eyes include, for example, various characteristics relating to human eyes, such as open/close time (speed of blinking) of eyelid when a human blinks and the movable range of eyeballs of the human. The predetermined condition is, for example, a condition set on the basis of the characteristics such as open/close time of eyelid of a human and the movable range of eyeballs, and will be described later in detail.

Further, in the storage unit 60, a control program for controlling the entire motion of the HMD 100 is stored. The method of installing the control program and the predetermined condition in the HMD 100 is not limited. For example, the control program and the predetermined condition may be installed by an arbitrary method via various recording media, the Internet, or the like.

The controller 70 includes hardware necessary for the configuration of a computer, such as a CPU (Central Processing Unit), a ROM (Read Only Memory), and a RAM (Random Access Memory). The CPU loads the control program stored in the storage unit 60 into the RAM and executes it, thereby executing various types of processing.

The specific configuration of the controller 70 is not limited. For example, a device such as an FPGA (Field Programmable Gate Array), an image processing IC (Integrated Circuit), and another ASIC (Application Specific Integrated Circuit) may be used.

In this embodiment, the CPU of the controller 70 executes the program according to this embodiment, thereby realizing the functional blocks, i.e., a motion information calculation unit 71, a motion control unit 72, and a model generation unit 73. Then, these functional blocks execute the information processing method according to the present technology. Note that dedicated hardware may be appropriately used for realizing the respective functional blocks.

To the motion information calculation unit 71, the imaging information of the left eye and the right eye of the user generated by the imaging unit 40 (the left-eye camera 40L and the right-eye camera 40R) is input. The motion information calculation unit 71 calculates motion information of each of the left eye and the right eye of the user on the basis of the input imaging information of the left eye and the right eye. In this embodiment, the motion information calculation unit 71 corresponds to the acquisition unit that acquires motion information of a left eye of a user and motion information of a right eye of the user.

In this embodiment, a line-of-sight direction of the left eye and a line-of-sight direction of the right eye are calculated as the motion information of the left eye and the right eye of the user, respectively. For example, in the case where a color image of the left eye of the user is input, the position of the black eye (pupil and iris) of the eyeball of the user is calculated with reference to the position of the inner corner of the left eye of the user. Then, the direction in which the black eye is facing is calculated as the line-of-sight direction of the left eye. Further, for example, in the case where a Purkinje image of the left eye is generated, the position of the black eye is calculated with reference to the spot of infrared illumination, and the line-of-sight direction of the left eye is calculated. Regarding the right eye, similarly, the line-of-sight direction of the right eye is calculated on the basis of the imaging information of the right eye of the user. In addition, an arbitrary method capable of detecting the line-of-sight direction may be used.

Further, in this embodiment, the open/close state of the left eye and the closed-eye period of the left eye are calculated as the motion information of the left eye, and the open/close state of the right eye and the closed-eye period of the right eye are calculated as the motion information of the right eye. For example, whether or not the left eye of the user is closed is determined on the basis of the color image or the like obtained by imaging the left eye of the user to calculate the open/close state of the left eye. That is, in the case where the left eye of the user is closed, it is the closed state. In the case where the left eye is not closed, it is the opened state. Note that the method or the like of determining the open/close state is not limited. For example, a threshold value or the like for determining the opened state and the closed state may be appropriately set.

Further, for example, the period from the time when the left eye of the user is closed (the time when entering the closed state) to the time when the left eye is opened (the time when entering the opened state) is calculated as the closed-eye period of the left eye. Regarding the right eye, similarly, the open/close state of the right eye and the closed-eye period of the right eye are calculated on the basis of the imaging information of the right eye of the user. In addition to the above-mentioned method, for example, it may be determined that the eye of the user is closed in the case where the line-of-sight direction of the user cannot be detected.

The motion control unit 72 calculates a control value for controlling the motion of the left eye of a model of the user and the motion of the right eye of the model of the user. The model of the user is, for example, a CG (Computer Graphics) avatar, a CG agent, or the like that is the other self (mirror or agent) of the user, which is displayed on a virtual space or the like. The model of the user is generated by the model generation unit 73 described below.

To the motion control unit 72, the predetermined condition corresponding to human characteristics relating to the motion of human eyes stored in the storage unit 60 and the motion information of each of the left eye and the right eye calculated by the motion information calculation unit 71 are input. The motion control unit 72 processes the motion information of the left eye and the right eye on the basis of the predetermined condition, and calculates a control value for controlling the motion of the left eye and the right eye of the model. The control value is, for example, a value for determining the timing of opening/closing the left eye and the right eye of the model, the line-of-sight direction, and the like. Therefore, the motion control unit 72 is capable of controlling, by calculating the control value, the motion of the left eye and the right eye of the model.

The model generation unit 73 generates a model of the user on the basis of the control value calculated by the motion control unit 72. For example, the model of the user is generated so that the left eye and the right eye are opened/closed at the timing specified by the control value. The data of the generated model is transmitted to a different device used by a different used via the communication unit 50. Then, the model of the user is displayed on a display apparatus such as a display used by the different user.

Further, to the model generation unit 73, data or the like of the model of the different user is input from the different device via the communication unit 50. The model generation unit 73 generates a model of the different user on the basis of the input data. The model of the different user is converted into a left-eye image and a right-eye image, and displayed on the left-eye and right-eye displays 30L and 30R of the HMD 100.

Therefore, the user is capable of viewing the model of the different user displayed on the display unit of the HMD 100, and the different user is capable of viewing the model of the user displayed on the display apparatus used by himself/herself. As a result, the user is capable of performing communication with the different user via each other's models.

Note that the present technology is not limited to the case where communication is performed by transmitting his/her model of to each other. For example, the model of the user and the model of the different user may be displayed together on a virtual space. In this case, the model generation unit 73 generates models of the user and the different user on the same virtual space. Then, the appearance of both the models viewed from a predetermined viewpoint is displayed on the display unit 30. Further, for example, the user may transmit his/her model (avatar) and the different user may transmit his/her video. In addition, the present technology is applicable to various forms of communication via the model of a user.

Method of Controlling Model

Figure 4:
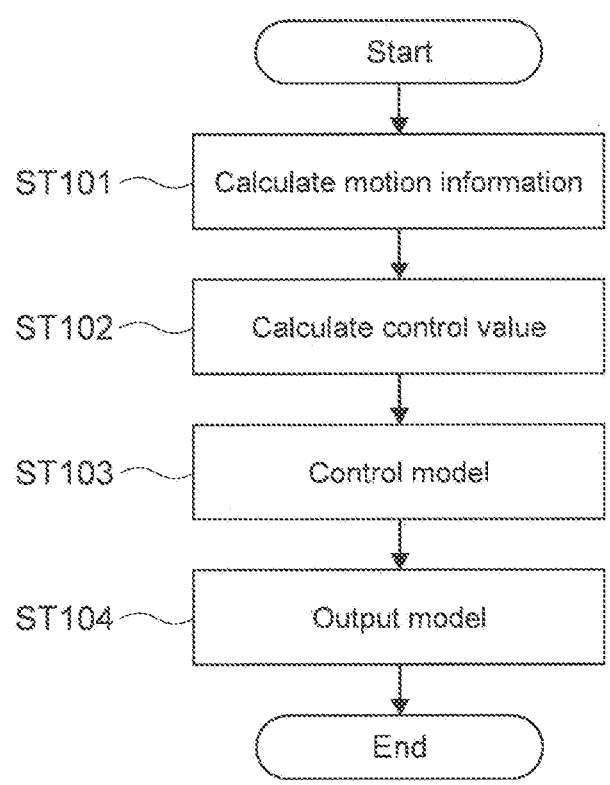
FIG. 4 is a flowchart showing a basic operation example of the HMD.

FIG. 4 is a flowchart showing a basic operation example of the HMD 100. The motion information calculation unit 71 calculates motion information of the left eye of a user and motion information of the right eye of the user on the basis of the imaging information of the left eye and the right eye of the user (Step 101).

The motion control unit 72 processes the motion information of the left eye and the right eye of the user on the basis of a predetermined condition, and calculates a control value for controlling the motion of the left eye and the right eye of the model (Step 102). The model generation unit 73 generates, on the basis of the control value calculated by the motion control unit 72, a model in which the motion of the left eye and the right eye is controlled (Step 103).

The data of the model generated by the model generation unit 73 is output to the communication unit 50 or the display unit 30 (Step 104), and the model of the user is displayed on the display apparatus used by the different user or the HMD 100 (the left-eye and right-eye displays 30L and 30R) worn by the user.

Note that the method of generating or controlling the model of the user is not limited to the method described in the flowchart shown in FIG. 4. For example, the control value of the model calculated by the motion control unit 72 may be transmitted to the different user (different device) via the communication unit 50. In this case, processing such as generating the model of the user by the different device on the basis of the control value may be performed. As a result, it is possible to reduce the communication load and the like. In addition, an arbitrary method capable of generating a model of a user may be used.

Hereinafter, processing of calculating the control value for controlling the left eye and the right eye of the model will be described by taking a specific example.

Figure 5:
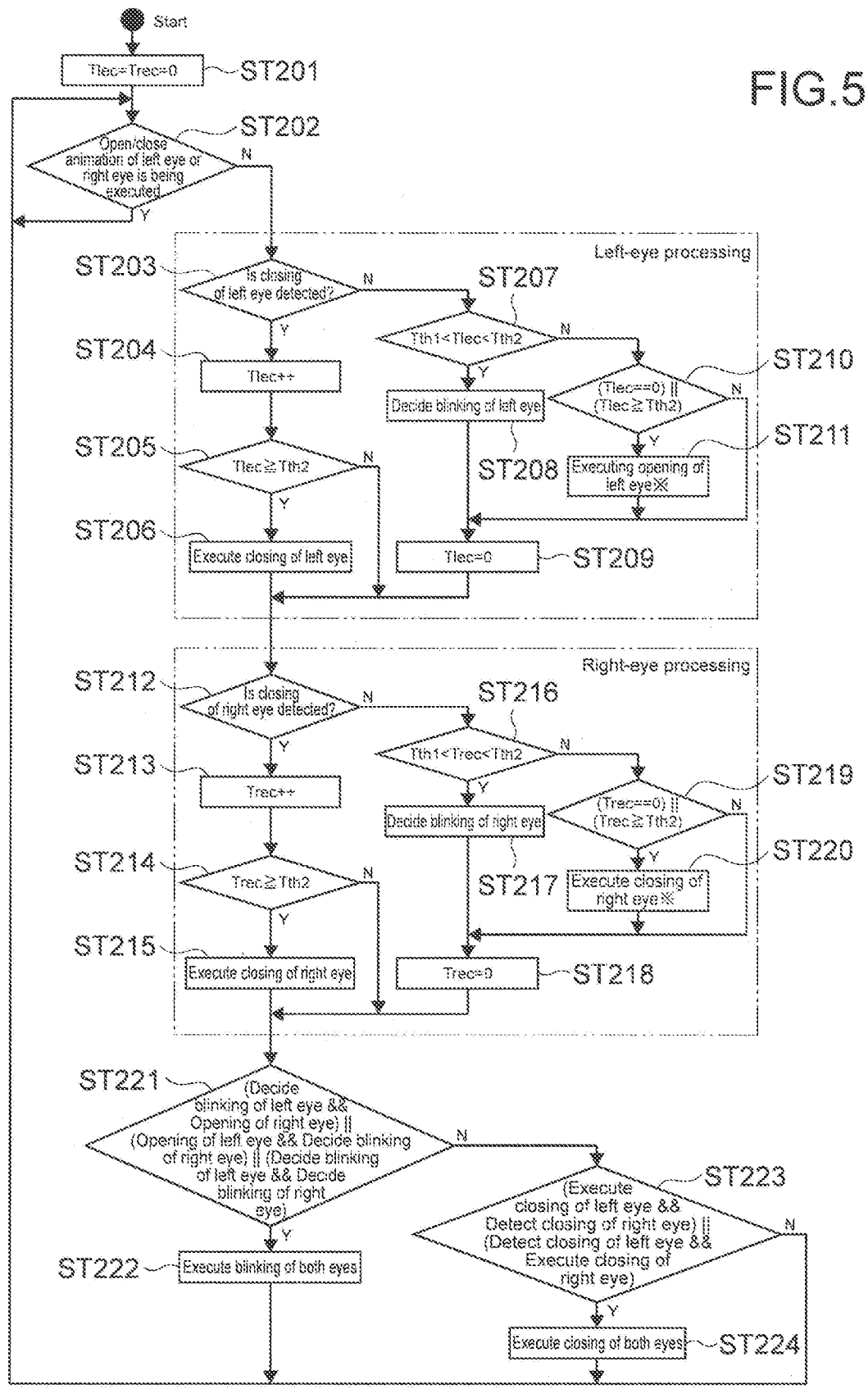
FIG. 5 is a flowchart showing an example of processing of calculating a control value by a motion control unit.

FIG. 5 is a flowchart showing an example of the processing of calculating the control value by the motion control unit 72. In the example shown in FIG. 5, a control value for controlling open/close motion of the left eye and the right eye of the model is calculated. In FIG. 5, a closed-eye period Tlec of the left eye and a closed-eye period Trec of the right eye are used. As described above, the closed-eye periods Tlec and Trec of the left eye and the right eye respectively represent measurement periods of the states where the left eye and the right eye are closed (the closed states), and are calculated by the motion information calculation unit 71.

Further, in FIG. 5, a noise determination period Tth1 and an eye-closing determination period Tth2 are used. The noise determination period Tth1, and the eye-closing determination period Tth2 each represent a threshold value set on the basis of human characteristics relating to the motion of human eyes.

In general, the blinking speed of human beings (period required for human eyes to blink) is 100 ms to 150 ms on average. That is, in the case where a human blinks, the state in which the eyelid is closed (closed-eye state) is continued only for a period of approximately 100 ms to 150 ms. In this embodiment, the noise determination period Tth1 and the eye-closing determination period Tth2 are set with reference to the human characteristics relating to the motion of the eyelid.

The noise determination period Tth1 represents a threshold value for determining whether or not the closed state of the right and left eyes (eyelids) is measurement noise. As the noise determination period Tth1, for example, a value (e.g., 90 ms) lower than 100 ms that is the lower limit value of the blinking speed of human beings is set.

For example, in the case where the closed-eye period Tlec (Trec) of the left eye (right eye) is shorter than the noise determination period Tth1, since open/close motion faster than the blinking speed of humans hardly occurs, it is determined to be measurement noise. Meanwhile, in the case where the closed-eye period Tlec (Trec) of the left eye (right eye) is longer than the noise determination period Tth1, since there is a possibility that the left eye (right eye) is performing blinking motion or eye-closing motion, it is determined not to be measurement noise. In this embodiment, the noise determination period Tth1 corresponds to a first period for determining the presence of absence of the closing motion of the eyelid.

The eye-closing determination period Tth2 represents a threshold value for determining whether the closed state of the right and left eyes (eyelids) is blinking motion or eye-closing motion. As the eye-closing determination period Tth2, for example, the upper limit value (150 ms) of the blinking speed of humans is set.

For example, the closed-eye period Tlec (Trec) of the left eye (right eye) is longer than the noise determination period Tth1 and shorter than the eye-closing determination period Tth2, it is determined that the left eye (right eye) is performing blinking motion. Meanwhile, in the case where the closed-eye period Tlec (Trec) of the left eye (right eye) is longer than the eye-closing determination period Tth2, it is determined that the left eye (right eye) is performing eye-closing motion. In this embodiment, the eye-closing determination period Tth2 corresponds to a second period for determining whether the closing motion of the eyelid is unconscious blinking motion or conscious eye-closing motion, which is longer than the first period.

As described above, on the basis of the noise determination period Tth1 and the eye-closing determination period Tth2, whether or not the left eye and the right eye of the user have performed unconscious blinking motion. In this embodiment, the condition for determining the blinking motion (Tth1<X<Tth2: X represents Tlec or Trec) corresponds to the determination condition for determining whether the open/close motion of the eyelid is unconscious blinking motion or conscious eye-closing motion.

Note that the method and the like of setting the noise determination period Tth1 and the eye-closing determination period Tth2 are not limited. For example, the noise determination period Tth1 and the eye-closing determination period Tth2 may be appropriately set depending on the processing speed of the controller 70, the characteristics of the user who uses the HMD 100, or the like.

The processing of calculating the control value will be described along the flowchart shown in FIG. 5. The user wearing the HMD 100 activates the HMD 100, and the closed-eye periods Tlec and Trec of the left eye and the right eye of the user are initialized to zero (Step 201). In this embodiment, while the user is using the HMD 100, the Steps described below are continuously looped.

In the model of the user, whether or not open/close animation of the left eye or right eye is being executed is determined (Step 202). In the case where the open/close animation is being executed (Yes in Step 202), Step 202 is executed again. In the case where the open/close animation is not being executed (No in Step 202), processing relating to the open/close motion of the left eye of the model is executed (Step 203 to Step 211).

On the basis of the open/close state of the left eye calculated by the motion information calculation unit 71, whether or not the closed state of the left eye has been detected is determined (Step 203) In the case where the closed state of the left eye has been detected, i.e., it is determined that the left eye is closed (Yes in Step 203), a predetermined interval (time interval) is added to the closed-eye period Tlec of the left eye (Step 204). Therefore, the closed-eye period Tlec of the left eye is rewritten to a value that is larger by the amount corresponding to the interval. The value of the interval is not limited. For example, a value corresponding to the cycle or the like of the loop processing may be appropriately set.

Whether or not the rewritten closed-eye period Tlec of the left eye is not less than the eye-closing determination period Tth2 is determined (Step 205). In the case where the closed-eye period Tlec of the left eye is not less than the eye-closing determination period Tth2 (Yes in Step 205), a control value including an instruction to close the left eye of the model is generated, and motion of closing the left eye of the model is executed (Step 206). Note that in the case where the left eye of the model already closed, a control value including an instruction to hold the left eye of the model in the closed state is generated.

In the case where the closed-eye period Tlec of the left eye is less than the eye-closing determination period Tth2 (No in Step 205), it is determined that the left eye is closed but conscious closing motion is not performed. That is, it is determined that the closed state of the left eye is measurement noise or being blinking motion. In this case, processing relating to the left eye is not executed.

Returning to Step 203, in the case where the closed state of the left eye is not detected, i.e., it is determined that the left eye is open (No in Step 203), the closed-eye period Tlec of the left eye at the end of the previous loop is determined (Step 207). In Step 207, whether or not the closed-eye period Tlec of the left eye is longer than the noise determination period Tth2 and shorter than the eye-closing determination period Tth2. That is, whether or not the closed-eye period Tlec of the left eye satisfies the determination condition (Tth1<Tlec<Tth2) of the blinking motion is determined.

In the case where it is determined that the closed-eye period Tlec of the left eye satisfies the determination condition of the blinking motion (Yes in (Step 207), the blinking motion of the left eye is decided (Step 208). Specifically, for example a variable associated with the presence or absence of the blinking motion of the left eye is rewritten. Note that in Step 208, a control value or the like for instructing the left eye of the model to perform blinking motion is not generated. After the blinking motion of the left eye is decided, the closed-eye period Tlec of the left eye is rewritten to zero (Step 209).

Returning to Step 207, in the case where it is determined that the closed-eye period Tlec of the left eye does not satisfy the determination condition of the blinking motion (No in Step 207), whether or not the motion to open the left eye of the model of the user is to be executed is determined (Step 210).

In Step 210, whether or not the closed-eye period Tlec of the left eye is zero (Tlec==0) is determined. In the case where the closed-eye period Tlec of the left eye is zero, it is determined that the left eye has been opened at the end of the previous loop. That is, it is determined that the opened state of the left eye is continued (held). Further, in Step 210, whether or not the closed-eye period Tlec of the left eye is not less than the eye-closing determination period Tth2 (Tlec Tth2) is determined. In the case where the closed-eye period Tlec of the left eye is not less than the eye-closing determination period Tth2, it is determined that the left eye that has been consciously closed has been opened.

In Step 210, whether or not the logical sum (OR) of these two conditions (Tlec==0, and Tlec Tth2) is satisfied is determined. That is, whether the opened state of the left eye has been continued or the closed left eye has been opened is determined. Note that in FIG. 5, "||" is used as the logical symbol representing OR.

In the case where the logical sum of Step 210 is satisfied (Yes in Step 210), a control value including an instruction to open the left eye of the model is generated, and the motion to open the left eye of the model is executed (Step 211). In the case where the left eye of the model is already opened (in the case where Tlec=0), a control value including an instruction to hold the left eye of the model in the opened state is generated. After Step 211, the closed-eye period Tlec of the left eye is rewritten to zero (Step 209).

Note that in the case of executing the instruction to open the left eye of the model, processing of determining whether or not the measurement result (No in Step 203) indicating that the left eye is opened is due to noise may be executed. For example, processing of measuring the period (opened-eye period) of the opened state of the left eye, regarding, in the case where the opened-eye period of the left eye is shorter than a predetermined threshold value, the measurement result as measurement noise, and keeping the left eye of the model closed may be executed. In addition, in the case of executing the motion to open the left eye of the model, arbitrary noise reduction processing may be executed.

In the case where the logical sum of Step 210 is not satisfied (No in Step 210), the closed-eye period Tlec of the left eye satisfies the relationship of 0<Tlec Tth1, and is determined as measurement noise. In this case, processing regarding the left eye of the model is not executed, and the closed-eye period Tlec of the left eye is rewritten to zero (Step 209).

As shown in FIG. 5, in the case where any one of determination of No in Step 205, Step 206, and Step 209 is executed, processing (Step 212 to Step 220) regarding open/close motion of the right eye of the model is executed. In FIG. 5, processing regarding the left eye is executed similarly to the above-mentioned processing regarding the left eye. Note that the order and the like of executing the processing regarding the left eye and the processing regarding the right eye are not limited, and the processing regarding the left eye may be executed after executing the processing regarding the right eye.

After the processing regarding the open/close motion of the right eye of the model, whether or not to cause the model to blink is determined (Step 221). In this embodiment, the presence or absence of blinking motion of the model is determined on the basis of the condition in which the state of the left eye and the state of the right eye are combined. In FIG. 5, the logical symbol "&&" representing a logical product (AND) is used for describing the condition as to whether or not to cause the model to blink.

In Step 221, whether or not the blinking of the left eye has been decided and the right eye is in the opened state (first condition) is determined. Further, whether or not the blinking of the right eye has been decided and the left eye is in the opened state (second condition) is determined. Further, whether or not the blinking of the left eye has been decided and the blinking of the right eye has been decided (third condition) is determined. That is, whether or not the blinking of both eyes has been decided is determined.

In Step 221, in the case where any one of the first to third conditions has been satisfied (Yes in Step 221), it is determined that the condition for causing the model to blink has been satisfied. In this case, a control value including an instruction to cause both the left eye and right eye of the model to blink is generated, and blinking of both eyes of the model is executed (Step 222).

Therefore, in this embodiment, not only in the case where blinking of both eyes has been decided (third condition) but also in the case where blinking of any one of the left eye and the right eye has been decided (first and second conditions), blinking motion of the left eye of the model and blinking motion of the right eye of the model are executed in association with each other. That is, in this embodiment, in the case where any one of the closed-eye period Tlec of the left eye and the closed-eye period Trec of the right eye is longer than the noise determination period Tth1 and shorter than the eye-closing determination period Tth2, blinking motion of both the left eye and right eye of the model can be executed.

Note that in the first and second conditions, a condition in which the eye whose blinking has not been decided is in the opened state is provided. As a result, for example, it is possible to prevent, in the case where a user closes one eye to wink (in the case where one eye is in the closed state), the model of the user from executing blinking of both eyes even if it is measured that the other eye has blinked.

The condition determined in Step 221 is not limited to the first to third conditions. For example, a fourth condition (fifth condition) in which blinking of the left eye (right eye) has been decided and the closed-eye period Trec (Tlec) of the right eye (left eye) is shorter than the eye-closing determination period Tth2 may be provided. As a result, for example, it is possible to execute, even in the case where whether or not one eye of the user is consciously closed has not been decided, blinking motion of both eyes of the model in association with each other in the case where blinking motion has been measured in the other eye. In addition, an arbitrary condition to cause both eyes of the model to blink may be appropriately set.

In the case where it is determined No in Step 221, the blinking motion of the model is not executed, and the presence or absence of execution of the motion to close an eye of the model is determined. In Step 223, the execution of the motion to close the left eye of the model has been decided (see Step 206), and whether or not the right eye is in the closed state (sixth condition) is determined. Further, the execution of the motion to close the right eye of the model has been decided (see Step 215), and whether or not the left eye is in the closed state (seventh condition) is determined.

In Step 223, in the case where any of the sixth and seventh conditions has been satisfied (Yes in Step 223), a control value including an instruction to cause both the left eye and right eye of the model to execute closing motion is generated, and the motion to close both eyes of the model is executed (Step 224).

Therefore, in this embodiment, in the case where the motion to close one eye has been decided and the other eye is in the closed state (sixth and seventh conditions), motion to close the left eye of the model and motion to close the right eye of the model are executed in association with each other. That is, in this embodiment, in the case where any one eye of the left eye and right eye of the user is in the closed state at the timing when the closed-eye period of the other eye is longer than the eye-closing determination period Tth2, it is possible to cause the left eye and right eye of the model to execute closing motion.

In the case where it is determined that neither the sixth condition nor the seventh conditions is satisfied, processing regarding the left eye and right eye of the model is not executed. As shown in FIG. 5, in the case where any one of Step 222, Step 224, and determination of No in Step 223 is executed, Step 202 is executed and the next loop processing is started.

In the flowchart shown in FIG. 5, the motion (Steps 206 and 215) to close the left eye and right eye of the model, and the motion (Steps 211 and 220) to open the left eye and right eye of the model are executed in the corresponding Steps. The present technology is not limited thereto, and control or the like to open/close the left eye and right eye of the model may be collectively executed at the end of the flowchart (before the next loop processing is started).

Figure 6:
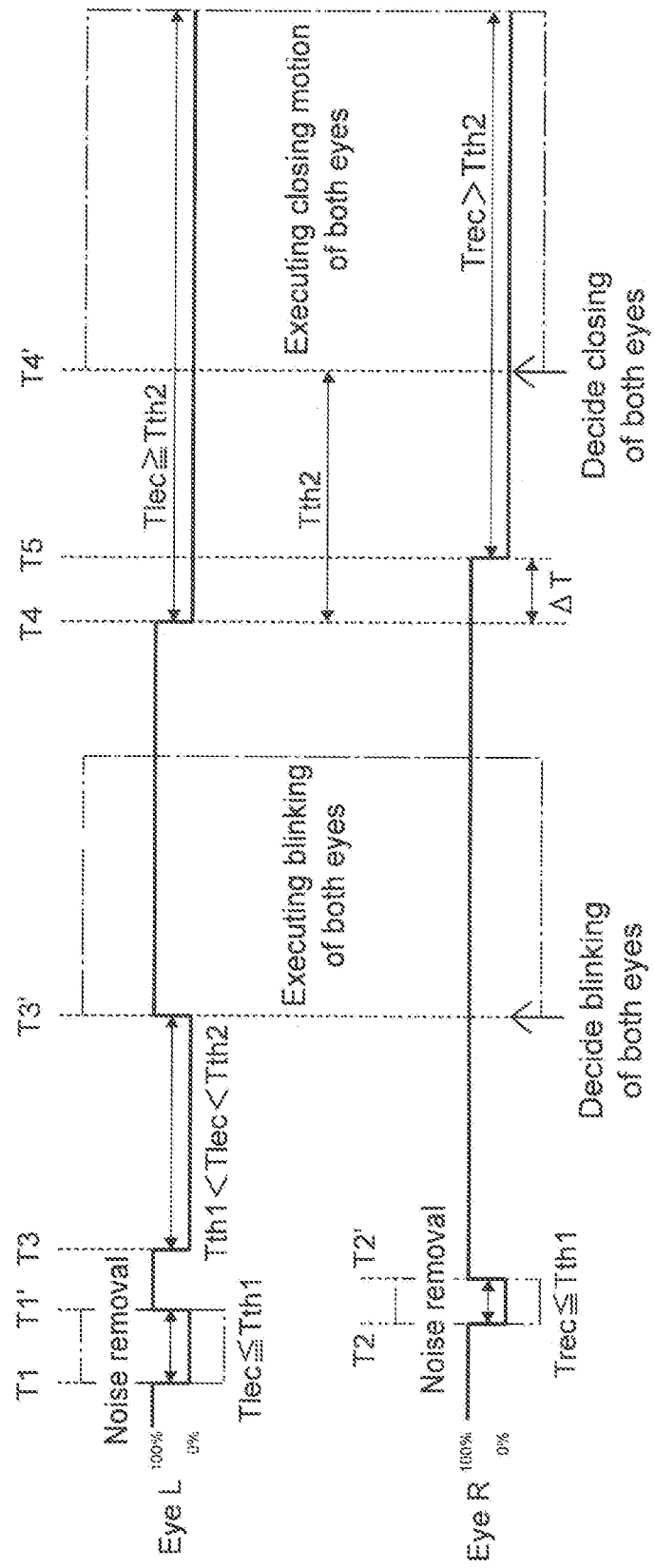
FIG. 6 is a time chart describing a control example of open/close motion of an eye of a model.

FIG. 6 is a time chart describing a control example of open/close motion of an eye of a model. In FIG. 6, the open/close state of the left eye (EyeL) of the user and the open/close state of the right eye (EyeR) of the user at each time are schematically illustrated. Note that each open/close state is shown in two states, i.e., the opened state (100%) and the closed state (0%).

In the example shown in FIG. 6, the closed state of the left eye is measured (detected) from a time T1 to a time T1'. In this case, the closed-eye period Tlec of the left eye is not more than the noise determination period Tth1. Therefore, the closed state of the left eye from the time T1 to the time T1' is determined as measurement noise at the time (time T1') when it enters the opened state (No in Step 210 in FIG. 5).

Further, regarding the right eye, the closed state of the right eye is measured from a time T2 to a time T2'. In this case, the closed-eye period Trec of the right eye is not more than the noise determination period Tth1. Therefore, the closed state of the right eye from the time T2 to the time T2' is determines as measurement noise at the time (time T2') when it enters the opened state (No in Step 219 in FIG. 5).

For the closed state of the left eye (right eye) determined as measurement noise, the closed-eye period Tlec (Trec) of the left eye (right eye) is rewritten to zero as noise removal processing, and control or the like of the model is not executed. Therefore, in this embodiment, the state of the left eye of the model is kept in the case where the closed-eye period Tlec of the left eye is shorter than the noise determination period Tth1, and the state of the right eye of the model is kept in the case where the closed-eye period Trec of the right eye is shorter than the noise determination period Tth1.

The closed state of the left eye is measured from a time T3 to a time T3'. In this case, the closed-eye period Tlec of the left eye is larger than the noise determination period Tth1, and shorter than the eye-closing determination period Tth2. Therefore, the closed state of the left eye from the time T3 to the time T3' is determined as blinking motion of the left eye at the time (time T3') when it enters the opened state, and the blinking motion of the left eye is decided (Step 208 in FIG. 5).

Further, at the time T3', the right eye is in the opened state. That is, at the time T3', the condition (first condition) in which the blinking of the left eye has been decided and the right eye is in the opened state is satisfied, and blinking motion of both eyes of the model is executed (Step 222 in FIG. 5). Note that in FIG. 6, the period when the blinking motion of both eyes of the model is executed is schematically illustrated.

As described above, in this embodiment, even in the case where it is detected that the right eye of the user is opened (in the opened state), non-linear control of causing the right eye of the model to execute blinking motion is executed. It goes without saying that in the case where the blinking of the right eyes has been decided and the left eye is in the opened state (second condition), non-linear control of causing the left eye of the model to blink is executed. As a result, it is possible to control the blinking motion of the left eye of the model and the blinking motion of the right eye of the model in association with each other.

In FIG. 6, the closed state of the left eye is measured from a time T4. At a time (time T4') when the eye-closing determination period Tth2 has elapsed after the left eye enters the closed state, motion to close the left eye of the model is executed (Step 206 in FIG. 5). Meanwhile, regarding the right eye, from a time T5 between the time T4 and the time T4', the closed state of the right eyes is measured. Then, at the time T4', the left eye remains in the closed state.

Therefore, at the time T4', the condition (sixth condition) in which the execution of the motion to close the left eye of the model has been decided and the right eye is in the closed state is satisfied. In this case, the motion to close both eyes of the model is executed (Step 224 in FIG. 5). As a result, it is possible to control the motion to close the left eye of the model and the motion to close the right eye of the model in association with each other. In FIG. 6, the period when both eyes of the model are closed is schematically illustrated.

Note that in the case of executing the control to close both eyes of the model at the same timing, a condition or the like may be provided. For example, a condition or the like regarding a time difference ΔT from when one eye enters in the closed state to when the other eye enters the closed state may be provided. For example, in the case where the time difference ΔT is smaller than a predetermined threshold value, processing of closing both eyes of the model may be executed regarding that both eyes are closed at substantially the same timing. Further, in the case where the time difference ΔT is larger than the threshold value, processing of closing only the eye that has entered the closed state first may be executed. As a result, it is possible to eliminate the possibility that the closed state of the eye measured thereafter is due to measurement noise.

It does not necessarily need to execute control to close both eyes of the model at the same timing. That is, it does not necessarily need to execute Step 223 and 224 shown in FIG. 5. In this case, for example, in the example shown in FIG. 6, processing of closing the left eye of the model at the time T4' and closing the right eye of the model after ΔT has elapsed from the time T4' is executed. In addition, an arbitrary method, condition, or the like of closing the eye of the model may be appropriately used.

Figure 7:
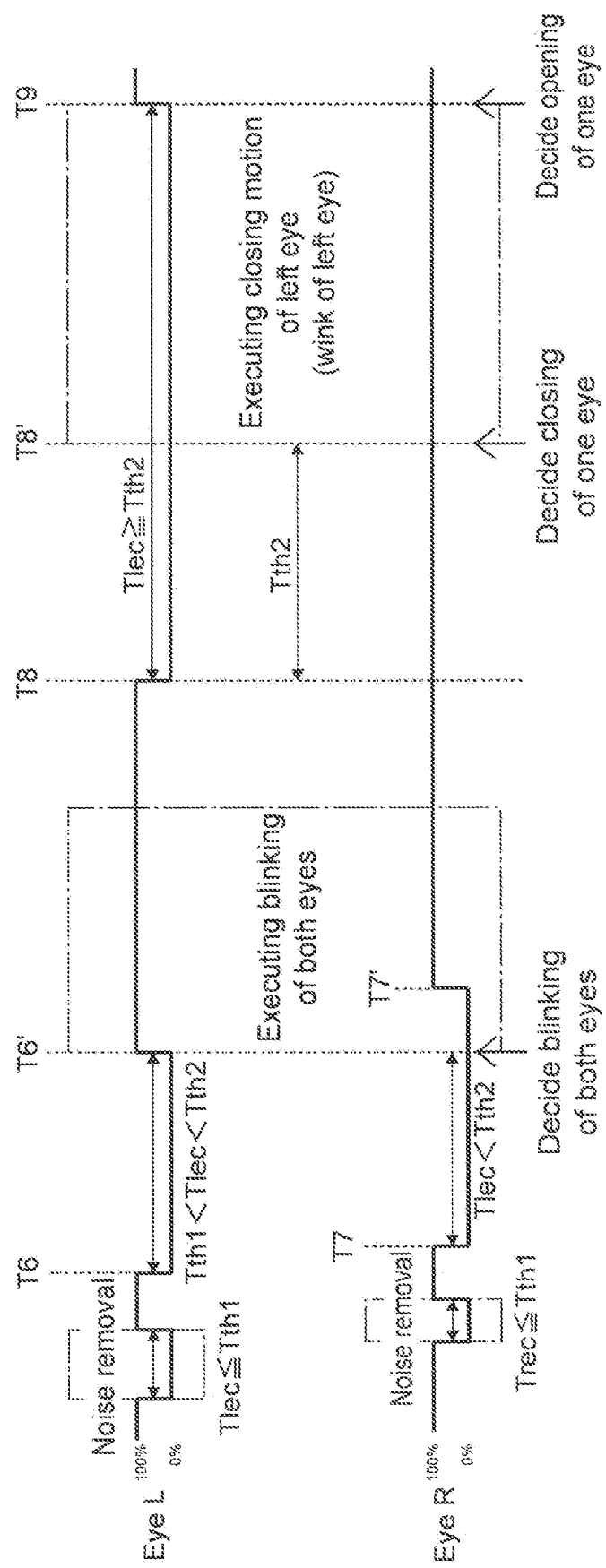
FIG. 7 is a time chart describing another control example of the open/close motion of the eye of the model.

FIG. 7 is a time chart describing another control example of the open/close motion of the eye of the model. The closed state of the left eye is measured from the time T6 to the time T6'. The closed state of the left eye from the time T6 to the time T6' is determined as the blinking motion of the left eye, and the blinking motion of the left eye is decided (Step 208 in FIG. 5). Further, regarding the right eye, the closed state of the right eye is measured from a time T7 between the time T6 and the time T6', and the closed state is continued to a time T7' that is after the time T6'. Therefore, at the time T6', the right eye is in the closed state.

That is, at the time T6', the condition (fourth condition) in which the blinking of the left eye has been decided and the closed-eye period Trec of the right eye is shorter than the eye-closing determination period Tth2 is satisfied, and the blinking motion of both eyes of the model is executed (Step 222 in FIG. 5).

As described above, it is possible to cause, even in the case where the blinking motion of one eye (right eye in FIG. 7) has not been decided, both eyes of the model to blink at the same timing in association with the blinking motion of the other eye (left eye in FIG. 7). Therefore, for example, it is possible to prevent the blinking timing from being shifted between the right and left eyes of the model.

In FIG. 7, the closed state of the left eye is measured from a time T8. At a time (time T8') when the eye-closing determination period Tth2 has elapsed after the left eye enters the closed state, motion to close the left eye of the model is executed (Step 206 in FIG. 5). Note that the right eye is in the opened state at this point, and control or the like to close both eyes of the model is not executed. Therefore, from the time T8', the model executes motion to close the left eye.

After the left eye of the model is closed, the opened state of the left eye is measured at a time T9. Since the closed-eye period Tlec of the left eye at the time T9 is not less than the eye-closing determination period Tth2, it is determined that the left eye that has been consciously closed has been opened (Yes in Step 210 in FIG. 5). Then, motion to open the left eye of the model is executed (Step 211 in FIG. 5). As a result, for example, the model of the user is capable of executing motion to close the left eye to wink.

As described above, in the HMD 100 according to this embodiment, motion information of a left eye of a user and motion information of a right eye of the user are acquired. Then, on the basis of a predetermined condition corresponding to human characteristics relating to motion of human eyes, motion of a left eye of a model of the user and motion of a right eye of the model of the user are controlled so as to be non-linear with respect to the acquired motion information of the left eye and the acquired motion information of the right eye. Further, the motion of the left eye of the model and the motion of the right eye of the model are controlled in association with each other. As a result, it is possible to cause both eyes of the model to operate in a human-like manner, and it is possible to activate communication by an avatar.

As a method of controlling motion of an eye of a model (avatar) of a user, a method of using a detection value from a sensing device or the like that detects motion of an eye of the user for controlling motion of the eye of the avatar without change is conceivable. For example, if an eye-closing detection value or the like from the sensing device that detects the closed state of the eye of the user is reflected in avatar control without change, there is a possibility that erroneous motion, an unintended wink, or the like due to detection noise is executed. As a result, the avatar executes unintended motion of the eye, which may interrupt communication.

In the HMD 100 according to this embodiment, the noise determination period Tth1 and the eye-closing determination period Tth2 which are set on the basis of the blinking speed of human beings are used. The motion control unit 72 determines, on the basis of the noise determination period Tth1 and the eye-closing determination period Tth2, the open/close motion of the eyelid of the left eye (right eye) of the user is determined from the open/close state and the closed-eye period of the left eye (right eye) of the user.

As a result, for example, it is possible to determine whether the open/close motion of the eyelid of the user is unconscious blinking motion or conscious eye-closing motion. As a result, it is possible to control the left eye of the model and the right eye of the model with high accuracy. Further, it is possible to execute processing of removing (ignoring) detection noise, motion that does not conform to human characteristics, and the like. As a result, erroneous motion, an unintended wink, or the like due to detection noise are prevented from occurring, and it is possible to achieve natural communication.

Further, in this embodiment, the motion control unit 72 controls the motion of the left eye of the model of the user and the motion of the right eye of the model of the user in association with each other. That is, the motion control unit 72 controls both eyes of the model in such a way that the right and left eyes execute blinking motion, motion to close the corresponding eye, or the like at similar timing.

For example, assumption is made that it is determined that only one eyelid of the user executes blinking motion. In this case, the model of the user is controlled to execute blinking motion of both eyes, assuming that blinking of only one eye is motion that does not normally occur. Further, in the case where there is a time difference between the motion to close the left eye and the motion to close the right eye, the model of the user is controlled to execute motion to close both eyes.

As a result, for example, such unnatural motion that only one eye of the model executes blinking motion is eliminated. Further, it is possible to reduce the discomfort that the timing to close the eye of the model differs between the right eye and the left eye. Therefore, it is possible to make the avatar of the user behave like a human being sufficiently, and for example, it is possible to sufficiently prevent a person in communication from being given unnecessary discomfort or an unpleasant feeling. As a result, it is easy to take pleasure or strike a chord due to the realism of the expression of the model, and sufficiently activate communication.

Further, by providing various conditions on the basis of human characteristics relating to motion of eyelids of human beings, it is possible to cause an avatar to various types of expression. For example, at the timing when one eye of the avatar is closed, blinking motion of both eyes is not executed and wink motion or the like can be expressed in a human-like manner (in the case where the first and second conditions are not satisfied). As described above, the avatar is capable of naturally expressing various types of motion of eyes, and it is possible to sufficiently activate communication.

Figure 8:
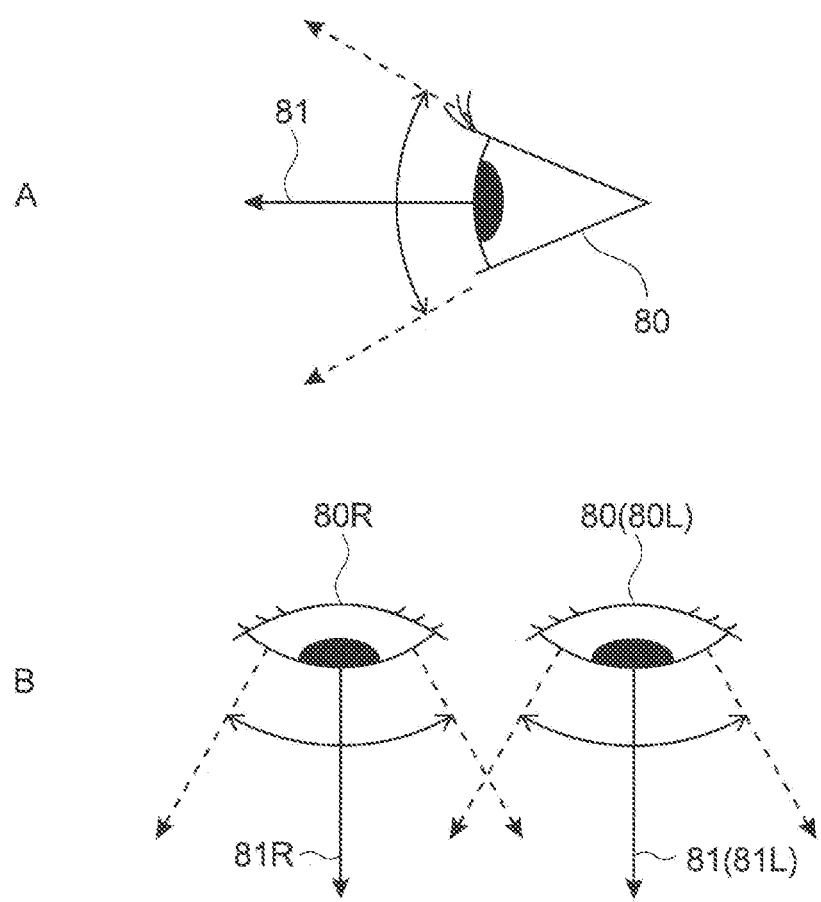
FIG. 8 is a schematic diagram describing human characteristics relating to motion of an eyeball.

FIG. 8 is a schematic diagram describing human characteristics relating to motion of an eyeball. Part A of FIG. 8 is a schematic diagram of a human eyeball 80 viewed from a side surface. Part B of FIG. 8 is a schematic diagram of the human eyeball 80 viewed from above. In FIG. 8, the line-of-sight direction of (reference line-of-sight direction 81) the eyeball 80 when the human is looking at the front is schematically illustrated.

In general, the working range of human's line of sight (movable range of the eyeball) is considered to be within ±30 degrees in the longitudinal direction, the lateral direction, and the oblique direction with reference to the state where the line of sight is directed to the front. For example, as shown in Part A of FIG. 8, the human eyeball is movable within the range of 30 degrees upward and 30 degrees downward from the reference line-of-sight direction 81. Further, as shown in Part B of FIG. 8, the human eyeball 80 is movable within the range of 30 degrees to the left side and 30 degrees to the right side from the reference line-of-sight direction 81.

In this embodiment, an eyeball motion condition with reference to a movable range of a line of sight of a human eyeball is set. For example, as the eyeball motion condition, the upper limit value of each angle of the line-of-sight direction in the case where the eyeball moves in the up and down direction and in the right and left direction is set to 30 degrees. In addition, the method of setting the eyeball motion condition is not limited. For example, by setting a region in which a black eye is movable, the eyeball motion condition may be set. The set eyeball motion condition is stored in the storage unit 60. In this embodiment, the eyeball motion condition corresponds to the condition relating to the movable range of the line of sight of the eyeball.

Figure 9:
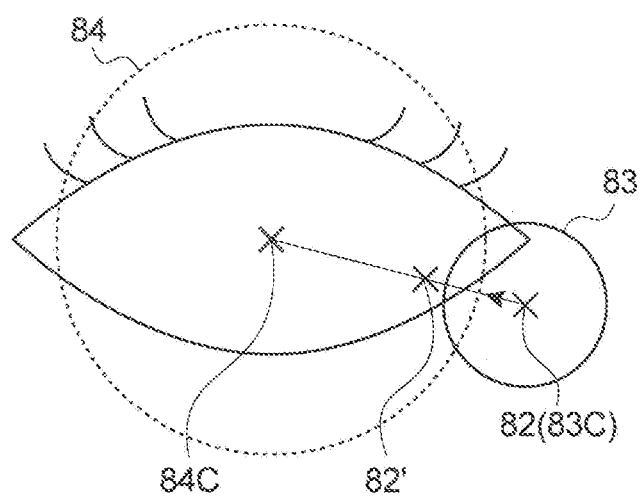
FIG. 9 is a schematic diagram showing an example of processing the line-of-sight direction based on the human characteristics relating to the motion of the eyeball.

FIG. 9 is a schematic diagram showing an example of processing the line-of-sight direction based on the human characteristics relating to the motion of the eyeball. In FIG. 9, a line-of-sight direction 82 detected by the motion information calculation unit 71 is represented by a central position 83C of a black eye 83. Further, in FIG. 9, a line-of-sight movable range 84 (movable range of the central position 83C of the black eye 83) set as the eyeball motion condition is illustrated by a dotted circle. A center 84C of the movable range 84 is the central position 83C of the black eye 83 corresponding to the reference line-of-sight direction. The shape and the like of the line-of-sight movable range 84 are not limited, and an arbitrary shape such as an elliptical shape may be appropriately set.

The motion control unit 72 determines whether or not the detected line-of-sight direction 82 is included in the line-of-sight movable range 84. In the case where the detected line-of-sight direction is included in the movable range 84, the calculated value of the line-of-sight direction 82 is used as it is.

As shown in FIG. 9, in the case where the central position 83C of the black eye 83 (the line-of-sight direction 82) is not included in the movable range 84, the motion control unit 72 corrects the line-of-sight direction 82 so as to be within the line-of-sight movable range 84.

For example, correction such as causing the line-of-sight direction 82 to move toward the center 84C of the line-of-sight movable range 84 to be within the line-of-sight movable range 84 is executed. In the example shown in FIG. 9, the position at which the straight line connecting the center 84C of the movable range 84 and the center 83C of the black eye 83 intersects the outer edge of the line-of-sight movable range 84 is a corrected line-of-sight direction 82' The method or the like of correcting the line-of-sight direction 82 is not limited, and an arbitrary method of correcting the line-of-sight direction 82 to be within the line-of-sight movable range 84 may be used.

Note that depending on the magnitude of deviation from the movable range 84, whether or not to process the detected line-of-sight direction 82 as noise may be determined. That is, in the case where the line-of-sight direction 82 deviates too much from the movable range 84, it may be ignored as noise. In this case, for example, processing of switching the value of the line-of-sight direction 82 to a value set by default, or the like may be executed. The above-mentioned processing is executed on each of the line-of-sight direction of the left eye and the line-of-sight direction of the right eye.

As described above, in this embodiment, the line-of-sight direction of the left eye and the line-of-sight direction of the right eye are corrected so as to be within the line-of-sight movable range 84 of the eyeball. As a result, it is possible to correct detection noise, detection error, and the like of the line-of-sight direction 82 of the user in accordance with the human characteristics.

Figure 10:
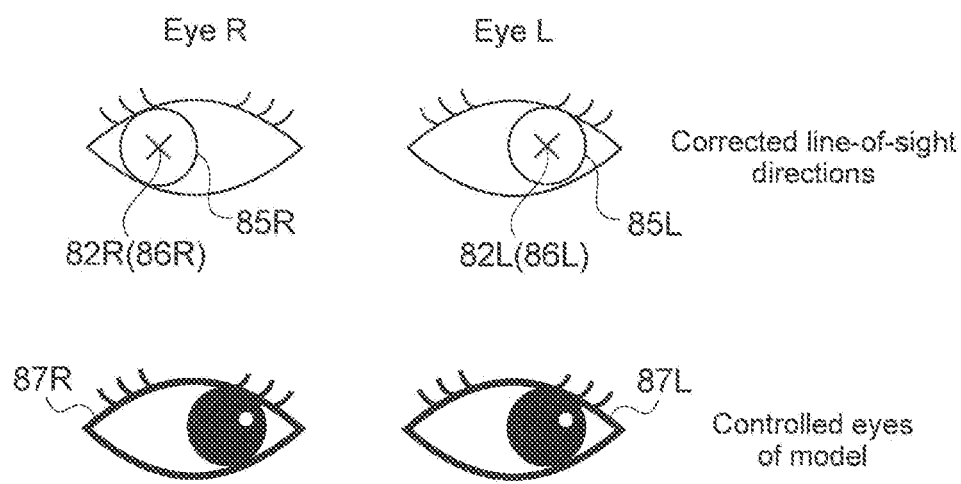
FIG. 10 is a schematic diagram describing an example of controlling the line-of-sight direction of a model.

FIG. 10 is a schematic diagram describing an example of controlling the line-of-sight direction of a model. In FIG. 10, corrected line-of-sight directions 82L and 82R of the right eye and the left eye are schematically illustrated by central positions 86L and 86R of the left and right black eyes 85L and 85R. Further, below the line-of-sight directions 82L and 82R of the left eye and the right eye, left eye and right eye 87L and 87R of the model controlled by the motion control unit 72 are respectively illustrated.

In this embodiment, the motion control unit 72 determines whether or not the line-of-sight direction 82L of the left eye and the line-of-sight direction 82R of the right eye are aligned.

Specifically, deviation between the line-of-sight direction 82L of the left eye and the line-of-sight direction 82R of the right eye (deviation between the left and right line-of-sight directions) is calculated, and whether or not the calculated deviation is larger than a predetermined threshold value set in advance is determined.

Therefore, the predetermined threshold value is a reference for determining whether or not deviation between the right and left line-of-sight directions is acceptable. The method or the like of setting the predetermined threshold value is not limited. For example, the predetermined threshold value may be appropriately set on the basis of motion characteristics of human eyeballs, detection accuracy of the line of sight in the HMD 100, design of the eye of the model, and the like.

As the deviation between the right and left line-of-sight directions, for example, the angle difference in the longitudinal direction between the line-of-sight directions 82L and 82R of the right eye and the left eye is calculated with reference to the reference line-of-sight direction. Similarly, the angle difference in the lateral direction between the line-of-sight directions 82L and 82R of the right eye and the left eye is calculated. Further, for example, the difference between the distance between the left black eye 85L and the right black eye 85R and the distance between the black eyes when looking at the front may be calculated as the deviation between the right and left line-of-sight directions. In addition, an arbitrary method capable of calculating the deviation between the right and left line-of-sight directions may be used.

In the case where the deviation between the right and left line-of-sight directions is larger than the predetermined threshold value, it is determined that the right and left line-of-sight directions are not aligned. In this case, for example, with reference to any of the right and left line-of-sight directions, the left eye and right eye of the model are controlled. For example, in the example shown in FIG. 10, with reference to the line-of-sight direction 82L of the left eye, the left eye 87L and the right eye 87R of the model are controlled so that the left and right eyes are directed in similar directions.

The condition or the like for determining the eye (line-of-sight direction) used as a reference is not limited, and various conditions may be provided. For example, such a condition that an eye having the line-of-sight direction closer to the line-of-sight direction that has been detected immediately before is used as a reference may be provided. Further, for example, an eye where the error detection frequency is less may be used as a reference. In addition, an arbitrary condition for determining an eye used as a reference may be appropriately provided.

As described above, in this embodiment, the motion control unit 72 controls, in the case where the deviation between the line-of-sight direction 82L of the left eye and the line-of-sight direction 82R of the right eye is larger than the predetermined threshold value, the line-of-sight direction of each of the left eye 87L and the right eye 87R of the model on the basis of the line-of-sight direction of any one of the line-of-sight direction 82L of the left eye and the line-of-sight direction 82R of the right eye. As a result, it is possible to control the line-of-sight directions of the left eye 87L and the right eye 87R of the model in association with each other, and it is possible to prevent such an unnatural situation that the left eye 87L and the right eye 87R of the model are directed in different directions from occurring. As a result, it is possible to cause the model of the user to behave like a human being.

Note that the present technology is not limited to the case where the line-of-sight directions are aligned as shown in FIG. 10 after the line-of-sight directions of the left eye and the right eye are corrected as shown in FIG. 9. The correction of the line-of-sight direction and the control of the line-of-sight directions of both eyes may be executed in association with each other. For example, in the case where only the line-of-sight direction of one eye is out of the line-of-sight movable range 84, the line-of-sight direction of the eye out of the movable range is corrected so as to align with the line-of-sight direction of the other eye. As a result, it is possible to omit the processing of calculating the deviation between the right and left line-of-sight directions, the processing of determining the line-of-sight direction to be used as a reference, and the like.

Further, in the case where both eyes are out of the movable range, the line-of-sight direction of the eye with a smaller amount of deviation from the movable range is corrected, and the line-of-sight direction of the other eye is corrected so as to match the correction result. Such processing is also possible. In addition, arbitrary processing capable of controlling the line-of-sight direction of the left eye of the model and the line-of-sight direction of the right eye of the model in association with each other may be executed.

Figure 11:
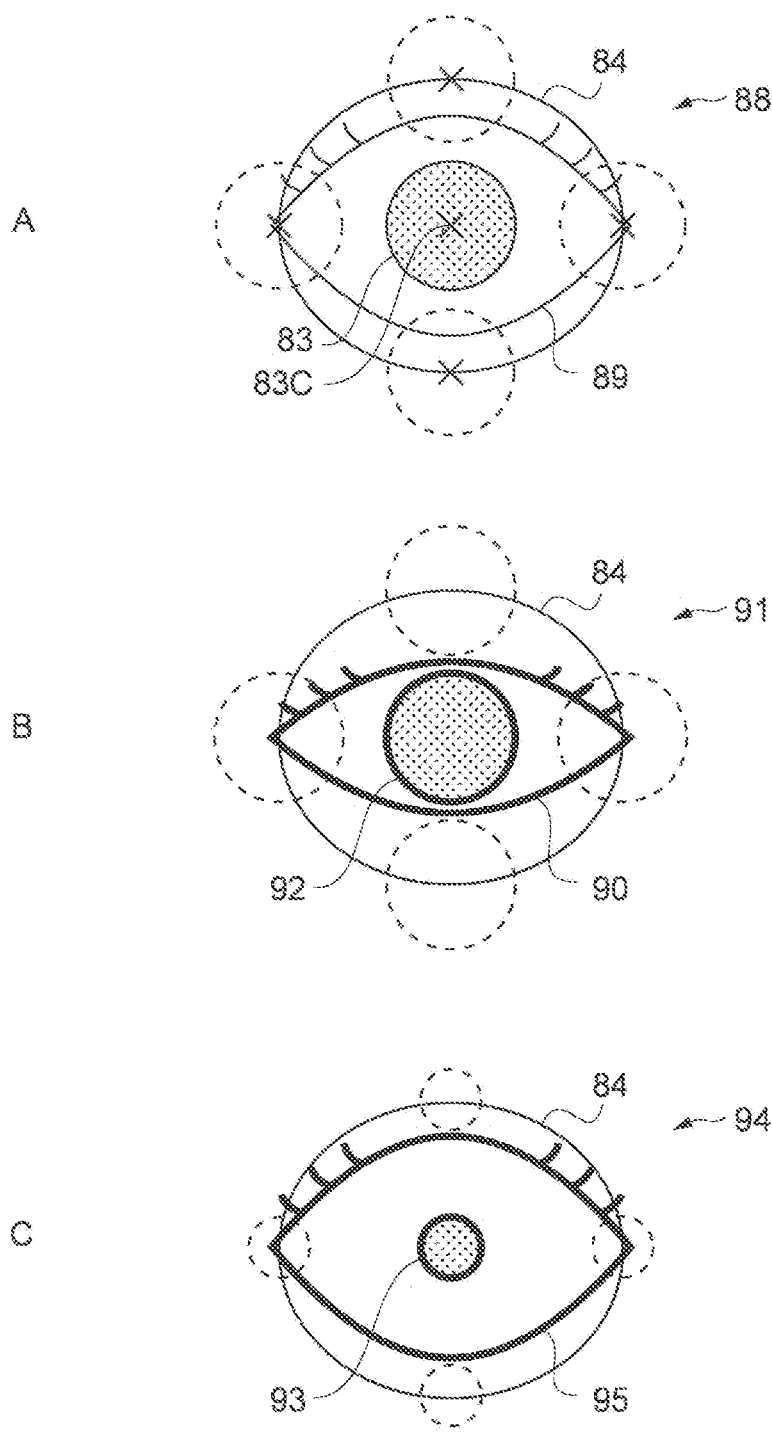
FIG. 11 is a schematic diagram describing motion of the eyeball of the model of the user.

FIG. 11 is a schematic diagram describing motion of the eyeball of the model of the user. Part A of FIG. 11 is a schematic diagram showing an example of the line-of-sight movable range 84 based on human characteristics. Part B of FIG. 11 and Part C of FIG. 11 are each a schematic diagram showing an example of design of the eye of the model viewed from the front.

In Part A of FIG. 11, the line-of-sight movable range 84 (movable range of the central position of the black eye 83) is indicated by a solid line and the black eye 83 in which the central position 83C of the black eye 83 is located at the upper end, lower end, right end, or left end of the movable range 84 is indicated by a dotted line. Further, in Part A of FIG. 11, a contour 89 of an average human eye 88 is schematically illustrated.

As described above, the line-of-sight movable range 84 is appropriately set in accordance with the movable range of the line of sight (human characteristics) of a human being. For example, in normal motion of a human being, a part of a black eye is often seen inside the contour even in the case where the human's light of sight is directed toward the upper limit of the movable range. For example, considering such a point, the line-of-sight movable range 84 can be set.

In the example shown in Part A of FIG. 11, even in the case where the central position 83C of the black eye 83 moves to the end of the line-of-sight movable range 84, the line-of-sight movable range 84 is set so that at least a part of the black eye 83 is inside the contour 89. That is, in Part A of FIG. 11, the line-of-sight movable range 84 is set within the range in which the human's line of sight can operate so that a white eye does not appear.

In the case where the line-of-sight movable range 84 based on human characteristics is applied to control the eye of the model having a shape or size different from those of the human eye 88, it is difficult to appropriately control the line of sight and the like of the model in some cases. For example, in the case where a model obtained by sufficiently deforming the user is created or a particular character is used as a model of the user, there is a possibility that the line of sight and the like of the model execute unintended motion.

For example, as shown in Part B of FIG. 11, assumption is made that an eye 91 of the model has a narrower contour 90 than the human eye 88, i.e., the eye 91 of the model is configured to have a smaller width (size) in the up and down direction. In such design that the contour 90 of the eye is narrow, in the case where the central position of a black eye 92 is located at the upper end or the lower end of the line-of-sight movable range 84 based on the human characteristics, the region of the black eye 92 completely comes out of the contour 90 and the eye of the model rolled back. That is, if the line-of-sight movable range 84, which is set so that at least a part of the black eye 83 is inside the contour in Part A of FIG. 11, is used as it is, a state in which the eye 91 of the model is rolled back occurs. For example, if the eye of the model is rolled back during communication, such a problem that discomfort or an unpleasant feeling is given to a person in communication occurs.

Further, for example, in Part C of FIG. 11, an eye 94 of the model including a black eye 93 having a size smaller than that of the human eye 88 is illustrated. Also in this case, in the case where the central position of the black eye 93 is located at the upper end or the lower end of the line-of-sight movable range 84 of the human being, the region of the black eye 93 completely comes out of a contour 95 and a white eye appears.

In this embodiment, the motion control unit 72 controls the line-of-sight direction of each of the left eye of the model and the right eye of the model on the basis of the movable range of the line of sight of the model defined for each model. The movable range of the line of sight of the model may be set in advance in accordance with, for example, the design (contour, the shape and size of the black eye) or the like of the eye of the model. Alternatively, on the basis of the design of the eye of the model, it may be calculated by the motion control unit 72. In addition, the method or the like of defining the movable range of the line of sight of the model is not limited.

Figure 12:
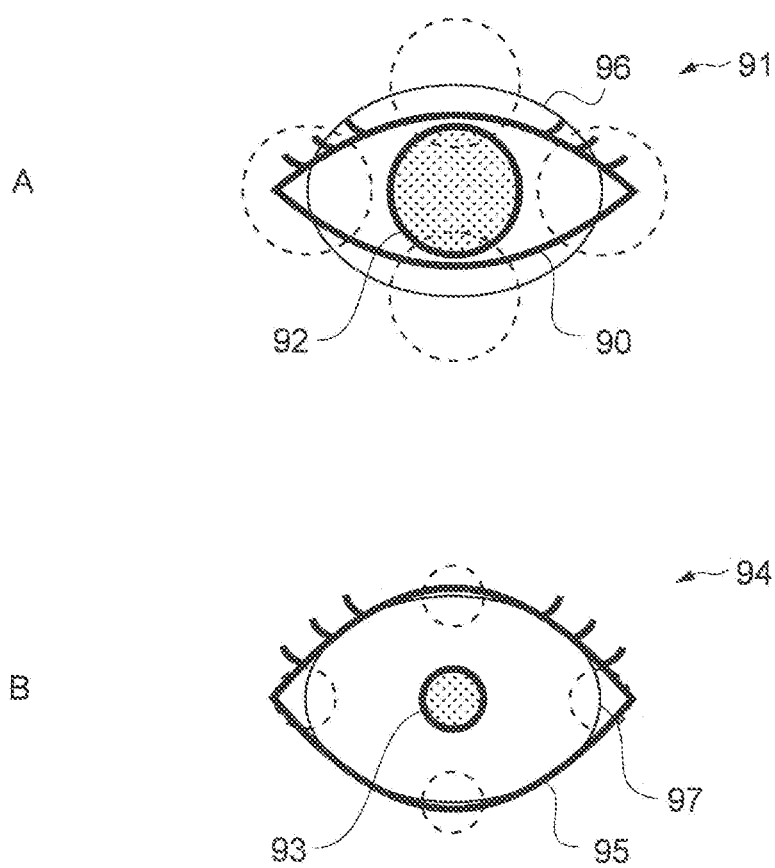
FIG. 12 is a schematic diagram showing an example of a movable range of a line of sight of a model.

FIG. 12 is a schematic diagram showing an example of the movable range of the line of sight of the model. Part A of FIG. 12 and Part B of FIG. 12 are respectively schematic diagrams showing an example of movable ranges 96 and 97 of a line of sight in the eyes 91 and 94 of the model shown in Part B of FIG. 11 and Part C of FIG. 11.

In the example shown in Part A of FIG. 12, even in the case where the central position of the black eye 92 moves to the end of the movable range 96 of the line of sight of the model, the movable range 96 of the line of sight of the model is set so that at least a part of the black eye 92 is inside the contour 90. Further, also in the example shown in Part B of FIG. 12, the movable range 97 of the line of sight of the model is set so that the black eye 93 does not completely come out of the contour 95.

The motion control unit 72 converts, in accordance with the movable range of the line of sight of the model, the line-of-sight direction detected by the motion information calculation unit 71 or the line-of-sight direction corrected so as to be within the line-of-sight movable range 84 based on the human characteristics. That is, an arbitrary value (human's line-of-sight direction) included in the line-of-sight movable range 84 based on the human characteristics is appropriately converted into a value (line-of-sight direction of the model) within the movable range of the line of sight of the model.

For example, the central position (line-of-sight direction) of the black eye 92 located at the upper end, lower end, left end, or right end of the line-of-sight movable range 84 in Part B of FIG. 11 is converted into the position of the upper end, lower end, left end, or right end of the movable range 96 of the line of sight of the model shown in Part A of FIG. 12. By this conversion, even in the case where the central position of the black eye 92 is detected at the upper end or lower end of the line-of-sight movable range 84, at least a part of the black eye 92 overlaps with the contour 90 in the eye 91 of the model.

As the processing of converting the line-of-sight direction, for example, processing such as multiplying the up and down angles and right and left angles of the line-of-sight direction with a predetermined coefficient according to the movable range of the line of sight of the model is executed. Further, for example, by filter processing using a conversion matrix or the like for converting the movable range of the human's line of sight into the movable range of the line of sight of the model, the line-of-sight direction may be converted. In addition, the processing or the like of converting the line-of-sight direction is not limited, and arbitrary conversion processing may be used.

On the basis of the converted line-of-sight direction, the motion control unit 72 calculates a control value for controlling the left eye and right eye of the model, and controls the line-of-sight direction of each of the left eye of the model and the right eye of the model.

As a result, it is possible to match the movable range of the eye of the model with the movable range of the eye of a user (human being), and appropriately control the black eye and the like of the model in accordance with the design of the eye of the model. Therefore, even in the case where the eye of the model is deformed, it is possible to prevent the eye of the model from being rolled back and express the line-of-sight direction and the like of the model in a human-like manner. As a result, it is possible to achieve natural communication without giving unnecessary discomfort or an unpleasant feeling to the other party, and sufficiently activate communication.

It goes without saying that the model of the user (eye of the model) is not limited to the examples shown in FIG. 11 and FIG. 12. For example, also in the case where a character other than human beings, such as an animal and a robot, is used, it is possible to appropriately control the line-of-sight direction and the like of each character on the basis of the movable range of the line of sight of the corresponding character.

Note that in the case of controlling the line-of-sight direction of the model, the area ratio of the black eye and the white eye (balance between the black eye and the white eye) in the eye of the model can be used.

For example, regarding the black eye (line-of-sight direction) converted into the movable range of the line of sight of the model, the motion control unit 72 executes processing of correcting the position of the black eye so that the area ratio between the black eye and the white eye is a predetermined value. Specifically, for example, in the case where the ratio of the area of the black eye is small, such control as moving the position of the black eye toward the center of the eye of the model (contour) is executed.

Further, for example, the movable range of the line of sight of the model (see Part A of FIG. 12 and Part B of FIG. 12) may be set on the basis of the area ratio between the black eye and the white eye. For example, even in the case where the black eye of the model is located at the end of the movable range, the movable range of the line of sight of the model is set so that the size (area) of the black eye displayed in the contour does not become too small. Further, for example, the movable range of the line of sight of the model may be set so that the region of the black eye does not come out of the contour. That is, the movable range may be set so that the area ratio between the black eye and the white eye is constant. In addition, the movable range of the line of sight of the model may be appropriately set on the basis of the area ratio between the black eye and the white eye.

As described above, on the basis of the area ratio between the black eye and the white eye in each of the left eye of the model and the right eye of the model, the line-of-sight direction of each of the left eye of the model and the right eye of the model is controlled. As a result, the problem that the black eye of the model is not displayed (is rolled back) or is unnaturally displayed small is eliminated, which makes it possible to reduce discomfort. As a result, it is possible to sufficiently activate communication.

OTHER EMBODIMENTS

The present technology is not limited to the above-mentioned embodiment, and various other embodiments can be realized.

In the above, on the basis of characteristics of the movable range of the line of sight of the eyeball, which are human characteristics relating to motion of human eyeballs, each of the left eye of the model of the user and the right eye of the model of the user has been controlled. The present technology is not limited thereto, and both eyes of the model may be controlled on the basis of characteristics of the movable velocity of human eyeballs.

For example, on the basis of characteristics of the movable velocity of human eyeballs, the upper limit value and the like relating to the movement velocity of the black eye of the user can be set. For example, on the basis of the distance (movement amount) that the black eye has moved during a predetermined period, the movement velocity of the black eye is calculated. In the case where the movement velocity of the black eye is larger than the set upper limit value, such determination that it is detection noise regarding that it exceeds the movable velocity of human eyeballs may be executed. As a result, a sudden change in the line of sight of the model is avoided, and it is possible to reduce discomfort. As a result, it is possible to achieve natural communication.

In the above-mentioned embodiment, the transmissive head mounted display (HMD 100) including cameras (the left-eye and right-eye camera 40L and 40R) capable of imaging both eyes of the user has been used. The present technology is not limited thereto. For example, an immersive HMD capable of imaging both eyes of the user may be used.

Figure 13:
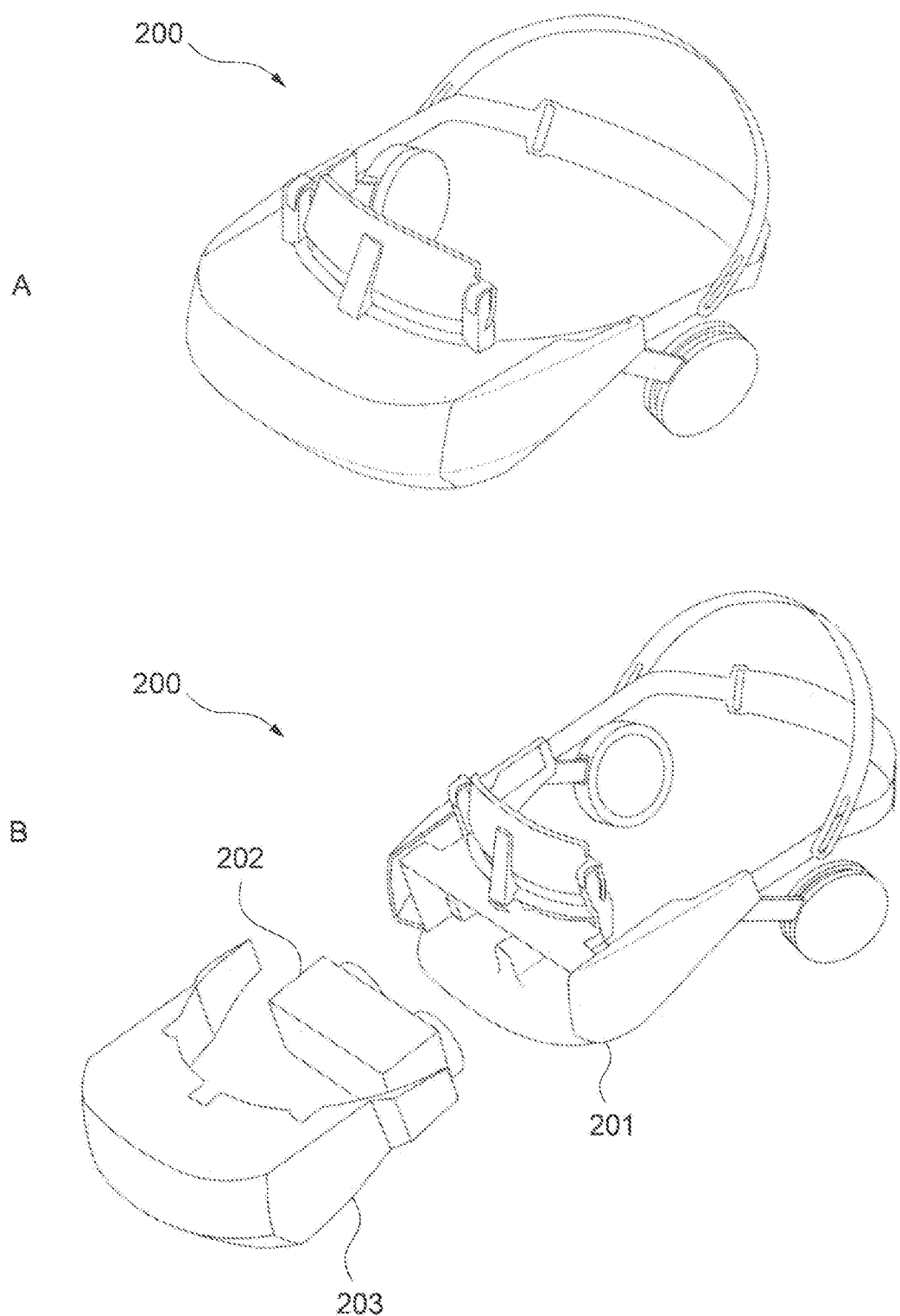
FIG. 13 is a schematic diagram showing an HMD according to another embodiment.

FIG. 13 is a schematic diagram showing an HMD according to another embodiment. Part A of FIG. 13 is a perspective view schematically showing the appearance of an HMD 200. Part B of FIG. 13 is a perspective view schematically showing the HMD 200 being disassembled. As shown in Part A of FIG. 13, the HMD 200 is an immersive head mounted display configured to cover the field of view of the user. Further, as shown in Part B of FIG. 13, the HMD 200 includes a mount part 201 to be mounted on the head of a user, a display unit 202 to be disposed in front of both eyes of the user, and a cover part 203 configured to cover the display unit 202.

In the HMD 200, a camera capable of imaging both eyes of the user is provided in, for example, the display unit, and the left eye of the user and the right eye of the user are imaged. As a result, it is possible to control the left eye of an avatar or the like of the user and the right eye of the avatar or the like of the user. Therefore, the user is capable of performing natural communication and the like via the avatar without being disturbed by the surrounding scenery or the like.

Note that the present technology is not limited to the head mounted display such as the HMD 100 and the HMD 200, and an arbitrary device capable of imaging both eyes of the user may be used. For example, it is possible to generate imaging information (image) including both eyes of the user in a PC including a digital camera, a mobile device such as a smartphone and a tablet, or the like. Motion information of the line-of-sight direction of the left eye of the user, the line-of-sight direction of the right eye of the user, or the like is acquired from the generated image, and the model of the user is controlled. As described above, the present technology is not limited to the case where each of the left eye of the user and the right eye of the user is imaged, and the present technology is applicable also to the case where an image including both eyes of the user is captured.

In the above, as the motion information of the left eye of the user and the right eye of the user, such noise removal processing that an invalid value such as detection noise is determined and the detection noise is ignored has been executed. For example, in the case where the hair or the like of the user is in contact with the eye, detection noise or the like continuously occurs in some cases. In such a case, the left eye of the model of the user and the right eye of the model of the user may be controlled so that default motion or random motion according to human characteristics relating to motion of human eyes is executed.

For example, both eyes of the model may be controlled so that the left eye of the model and the right eye of the model randomly blink at the same timing. In this case, for example, the number of blinks of the model performed in a certain period may be set on the basis of human characteristics such as the average number of blinks of human beings.

Further, for example, in the case where only motion information of one eye of the user continuously includes detection noise or the like, control of the right and left eyes of the model in association with each other may be performed on the basis of motion information of the other eye. In addition, in the case where an invalid detection value or the like is acquired as motion information, arbitrary control of both eyes of the model in association with each other on the basis of human characteristics may be executed. As a result, even in the case where there is detection noise or the like, it is possible to cause both eyes of the model to behave like a human being, and continue natural communication.

Further, in the case where motion of the eye of the user exceeds the detectable range or detectable velocity of the recognizer (sensing device) such as a camera that images the eye of the user, there is a possibility (detection error) that the line-of-sight direction of the left eye of the user, the line-of-sight direction of the right eye of the user, and the like cannot be detected. Also in such a case, it is possible to control both eyes of the model of the user in a human-like manner on the basis of human characteristics.

In the above, as the model of the user, the CG avatar or CG agent displayed in the virtual space has been described. The model of the user is not limited to the CG model and the like on the virtual space. For example, as the model of the user, an AI (Artificial Intelligence) robot, a robot agent, a humanoid, or the like may be used. The present technology is applicable to expression control including motion control of the left eye of the model and the right eye of the model.

In the above, the information processing apparatus (HMD 100) including the communication unit and the like has executed the information processing method according to the present technology including control of the left eye of the model of the user and the right eye of the model of the user in association with each other. The present technology is not limited thereto, and a cloud server may execute the information processing method according to the present technology. That is, the function of the information processing apparatus may be installed in the cloud server. In this case, the cloud server operates as the information processing apparatus according to the present technology.

Further, the present technology is not limited to the case where a computer that acquires motion information of a left eye of a user and motion information of a right eye of the user executes the information processing method according to the present technology, and another computer capable of communicating, via a network or the like, with the computer that acquires the motion information of the left eye of the user and the motion information of the right eye of the user may be linked with each other to construct a model control system according to the present technology.

In other words, the information processing method and the program according to the present technology can be executed not only in a computer system constituted by a single computer but also in a computer system in which a plurality of computers operates in association with each other. Note that, in the present disclosure, the system refers to an aggregate of a plurality of components (apparatuses, modules (parts), or the like) regardless of whether or not all components are accommodated in the same housing. Therefore, both a plurality of apparatuses which is accommodated in separate housings and connected via a network and a single apparatus in which a plurality of modules is accommodated in one housing are systems.

Execution of the information processing method and the program according to the present technology by the computer system includes, for example, a case where processing of calculating motion information of the left eye and motion information of the right eye, processing of controlling the model of the user, or the like is executed by a single computer and a case where the respective processes are performed by different computers. Further, execution of each process by a predetermined computer includes causing other computers to execute some or all of processes and acquiring a result thereof.

In other words, the information processing method and the program according to the present technology can be applied to a cloud computing configuration in which one function is shared and processed by a plurality of apparatuses via a network.

Among the feature parts according to the present technology described above, at least two feature parts may be combined. In other words, various feature parts described in the respective embodiments may be combined arbitrarily without distinction of each embodiment. Further, the various effects described above are merely examples and are not limited, and other effects may be included.

It should be noted that the present technology may take the following configurations.

(1) An information processing apparatus, including:
an acquisition unit that acquires motion information of a left eye of a user and motion information of a right eye of the user; and a motion control unit that controls, on a basis of a predetermined condition corresponding to human characteristics relating to motion of human eyes, motion of a left eye of a model of the user and motion of a right eye of the model of the user in association with each other so as to be non-linear with respect to the acquired motion information of the left eye and the acquired motion information of the right eye.

(2) The information processing apparatus according to (1), in which
the acquisition unit acquires the motion information of the left eye of the user and the motion information of the right eye of the user on the basis of imaging information of the left eye of the user and imaging information of the right eye of the user.

(3) The information processing apparatus according to (1) or (2), in which
the predetermined condition is a condition corresponding to human characteristics relating to at least one of motion of an eyelid and motion of an eyeball.

(4) The information processing apparatus according to (3), in which
the predetermined condition includes a determination condition for determining whether or not open/close motion of the eyelid is unconscious blinking motion or conscious eye-closing motion.

(5) The information processing apparatus according to (4), in which
the determination condition includes a first period for determining presence or absence of the close motion of the eyelid and a second period for determining whether or not the close motion of the eyelid is the unconscious blinking motion or the conscious eye-closing motion, the second period being longer than the first period.

(6) The information processing apparatus according to (4) or (5), in which
the acquisition unit acquires an open/close state of the left eye, an open/close state of the right eye, a closed-eye period of the left eye, and a closed-eye period of the right eye.

(7) The information processing apparatus according to (5) or (6), in which
the motion control unit causes, where any one of a closed-eye period of the left eye and a closed-eye period of the right eye is longer than the first period and shorter than the second period, both the left eye of the model and the right eye of the model to execute blinking motion.

(8) The information processing apparatus according to any one of (5) to (7), in which
the motion control unit causes, where any one of the left eye of the user and the right eye of the user is in a closed state at a timing when a closed-eye period of the other eye is longer than the second period, both the left eye of the model and the right eye of the model to execute closing motion.

(9) The information processing apparatus according to any one of (5) to (8), in which
the motion control unit keeps, where a closed-eye period of the left eye is shorter than the first period, a state of the left eye of the model, and keeps, where a closed-eye period of the right eye is shorter than the first period, a state of the right eye of the model.

(10) The information processing apparatus according to any one of (3) to (9), in which
the predetermined condition includes a condition relating to a movable range of a line of sight of the eyeball.

(11) The information processing apparatus according to (10), in which
the acquisition unit acquires a line-of-sight direction of the left eye and a line-of-sight direction of the right eye.

(12) The information processing apparatus according to (10) or (11), in which
the motion control unit controls, where deviation between a line-of-sight direction of the left eye and a line-of-sight direction of the right eye is larger than a predetermined threshold value, the line-of-sight direction of each of the left eye of the model and the right eye of the model on a basis of any one of the line-of-sight direction of the left eye and the line-of-sight direction of the right eye.

(13) The information processing apparatus according to any one of (10) to (12), in which
the motion control unit corrects a line-of-sight direction of the left eye and a line-of-sight direction of the right eye so as to be within the movable range of the line of sight of the eyeball to control the line-of-sight direction of each of the left eye of the model and the right eye of the model.

(14) The information processing apparatus according to any one of (10) to (13), in which
the motion control unit controls, on a basis of a movable range of a line of sight of an eyeball of the model, a line-of-sight direction of each of the left eye of the model and the right eye of the model.

(15) The information processing apparatus according to any one of (10) to (14), in which
the motion control unit controls, on a basis of area ratio between a black eye and a white eye in each of the left eye of the model and the right eye of the model, a line-of-sight direction of each of the left eye of the model and the right eye of the model.

[16] An information processing method executed by a computer system, including:
acquiring motion information of a left eye of a user and motion information of a right eye of the user; and
controlling, on a basis of a predetermined condition corresponding to human characteristics relating to motion of human eyes, motion of a left eye of a model of the user and motion of a right eye of the model of the user in association with each other so as to be non-linear with respect to the acquired motion information of the left eye and the acquired motion information of the right eye.

[17] A program that causes a computer system to execute the steps of:
acquiring motion information of a left eye of a user and motion information of a right eye of the user; and
controlling, on a basis of a predetermined condition corresponding to human characteristics relating to motion of human eyes, motion of a left eye of a model of the user and motion of a right eye of the model of the user in association with each other so as to be non-linear with respect to the acquired motion information of the left eye and the acquired motion information of the right eye.

REFERENCE SIGNS LIST 1 a user
30 display unit
40 imaging unit
50 communication unit
60 storage unit
70 controller
71 motion information calculation unit
72 motion control unit
73 model generation unit
82L line-of-sight direction of the left eye
82R line-of-sight direction of the right eye
83 black eye
84 movable range of a line of sight
87L left eye of a model
87R right eye of a model
88 human eye
91, 94 eye of a model
96, 97 movable range of a line of sight of a model
100, 200 HMD

The invention claimed is:

1. An information processing apparatus, comprising:
an acquisition unit configured to acquire motion information of a left eye of a user and motion information of a right eye of the user; and
a motion control unit configured to control, based on a predetermined condition corresponding to human characteristics relating to motion of human eyes, motion of a left eye of a displayed model of the user and motion of a right eye of the displayed model of the user in association with each other so as to be non-linear with respect to the acquired motion information of the left eye and the acquired motion information of the right eye,
wherein the motion control unit controls the motion of the left eye of the displayed model and the motion of the right eye of the displayed model to close at a same timing when the left eye of the user and the right eye of the user are determined to close at different times from one another according to the acquired motion information, and
wherein the acquisition unit and the motion control unit are each implemented via at least one processor.

2. The information processing apparatus according to claim 1, wherein
the acquisition unit acquires the motion information of the left eye of the user and the motion information of the right eye of the user based on imaging information of the left eye of the user and imaging information of the right eye of the user.

3. The information processing apparatus according to claim 1, wherein
the predetermined condition is a condition corresponding to human characteristics relating to at least one of motion of an eyelid or motion of an eyeball.

4. The information processing apparatus according to claim 3, wherein
the predetermined condition includes a determination condition for determining whether or not open/close motion of the eyelid is unconscious blinking motion or conscious eye-closing motion.

5. The information processing apparatus according to claim 4, wherein
the determination condition includes a first period for determining presence or absence of the close motion of the eyelid and a second period for determining whether or not the close motion of the eyelid is the unconscious blinking motion or the conscious eye-closing motion, the second period being longer than the first period.

6. The information processing apparatus according to claim 4, wherein
the acquisition unit acquires an open/close state of the left eye, an open/close state of the right eye, a closed-eye period of the left eye, and a closed-eye period of the right eye.

7. The information processing apparatus according to claim 5, wherein
the motion control unit causes, where any one of a closed-eye period of the left eye and a closed-eye period of the right eye is longer than the first period and shorter than the second period, both the left eye of the model and the right eye of the displayed model to execute blinking motion.

8. The information processing apparatus according to claim 5, wherein
the motion control unit causes, where any one of the left eye of the user and the right eye of the user is in a closed state at a timing when a closed-eye period of the other eye is longer than the second period, both the left eye of the displayed model and the right eye of the displayed model to execute closing motion.

9. The information processing apparatus according to claim 5, wherein
the motion control unit keeps, where a closed-eye period of the left eye is shorter than the first period, a state of the left eye of the displayed model, and keeps, where a closed-eye period of the right eye is shorter than the first period, a state of the right eye of the displayed model.

10. The information processing apparatus according to claim 3, wherein
the predetermined condition includes a condition relating to a movable range of a line of sight of the eyeball.

11. The information processing apparatus according to claim 10, wherein
the acquisition unit acquires a line-of-sight direction of the left eye and a line-of-sight direction of the right eye.

12. The information processing apparatus according to claim 10, wherein
the motion control unit controls, where deviation between a line-of-sight direction of the left eye and a line-of-sight direction of the right eye is larger than a predetermined threshold value, the line-of-sight direction of each of the left eye of the displayed model and the right eye of the displayed model based on any one of the line-of-sight direction of the left eye and the line-of-sight direction of the right eye.

13. The information processing apparatus according to claim 10, wherein
the motion control unit corrects a line-of-sight direction of the left eye and a line-of-sight direction of the right eye so as to be within the movable range of the line of sight of the eyeball to control the line-of-sight direction of each of the left eye of the displayed model and the right eye of the displayed model.

14. The information processing apparatus according to claim 10, wherein
the motion control unit controls, based on a movable range of a line of sight of an eyeball of the displayed model, a line-of-sight direction of each of the left eye of the displayed model and the right eye of the displayed model.

15. The information processing apparatus according to claim 10, wherein
the motion control unit controls, based on an area ratio between a black eye and a white eye in each of the left eye of the displayed model and the right eye of the displayed model, a line-of-sight direction of each of the left eye of the displayed model and the right eye of the displayed model.

16. The information processing apparatus according to claim 1, wherein
the motion control unit controls the motion of the left eye of the displayed model and the motion of the right eye of the displayed model to close at the same timing when the left eye of the user and the right eye of the user are determined to close within a threshold time of one another according to the acquired motion information.

17. An information processing method executed by a computer system, comprising:
acquiring motion information of a left eye of a user and motion information of a right eye of the user; and
controlling, based on a predetermined condition corresponding to human characteristics relating to motion of human eyes, motion of a left eye of a displayed model of the user and motion of a right eye of the displayed model of the user in association with each other so as to be non-linear with respect to the acquired motion information of the left eye and the acquired motion information of the right eye, wherein the motion of the left eye of the displayed model and the motion of the right eye of the displayed model are controlled to close at a same timing when the left eye of the user and the right eye of the user are determined to close at different times from one another according to the acquired motion information.

18. A non-transitory computer-readable storage medium having embodied thereon a program, which when executed by a computer system causes the computer system to execute a method, the method comprising:

acquiring motion information of a left eye of a user and motion information of a right eye of the user; and controlling, based on a predetermined condition corresponding to human characteristics relating to motion of human eyes, motion of a left eye of a displayed model of the user and motion of a right eye of the displayed model of the user in association with each other so as to be non-linear with respect to the acquired motion information of the left eye and the acquired motion information of the right eye, wherein the motion of the left eye of the displayed model and the motion of the right eye of the displayed model are controlled to close at a same timing when the left eye of the user and the right eye of the user are determined to close at different times from one another according to the acquired motion information.

* * * * *